US011095405B2

(12) United States Patent
Zhao et al.

(10) Patent No.: US 11,095,405 B2
(45) Date of Patent: Aug. 17, 2021

(54) ELECTRONIC DEVICE AND METHOD FOR WIRELESS COMMUNICATION

(71) Applicant: Sony Corporation, Tokyo (JP)

(72) Inventors: Youping Zhao, Beijing (CN); Dongzhi Zhu, Beijing (CN); Chen Sun, Beijing (CN); Xin Guo, Beijing (CN); Kangyi Liu, Beijing (CN); Wei Ding, Beijing (CN)

(73) Assignee: SONY CORPORATION, Tokyo (JP)

( * ) Notice: Subject to any disclaimer, the term of this patent is extended or adjusted under 35 U.S.C. 154(b) by 115 days.

(21) Appl. No.: 16/492,159

(22) PCT Filed: May 3, 2018

(86) PCT No.: PCT/CN2018/085430
§ 371 (c)(1),
(2) Date: Sep. 9, 2019

(87) PCT Pub. No.: WO2018/205877
PCT Pub. Date: Nov. 15, 2018

(65) Prior Publication Data
US 2021/0143949 A1    May 13, 2021

(30) Foreign Application Priority Data
May 11, 2017    (CN) .......................... 201710330397.4

(51) Int. Cl.
*H04L 5/00*    (2006.01)
*H04W 72/08*    (2009.01)
*H04W 72/04*    (2009.01)

(52) U.S. Cl.
CPC ......... *H04L 5/0035* (2013.01); *H04W 72/048* (2013.01); *H04W 72/082* (2013.01)

(58) Field of Classification Search
CPC .. H04L 5/0035; H04W 72/048; H04W 72/082
(Continued)

(56) References Cited

U.S. PATENT DOCUMENTS

2018/0145805 A1* 5/2018 Maaref ................. H04L 5/0092
2018/0242325 A1* 8/2018 Guo ...................... H04W 28/16
2020/0007200 A1* 1/2020 Schreck ............... H04B 7/0417

FOREIGN PATENT DOCUMENTS

CN      101394613 A    3/2009
CN      101986574 A    3/2011
(Continued)

OTHER PUBLICATIONS

International Search Report and Written Opinion dated Jul. 10, 2018 for PCT/CN2018/085430 filed on May 3, 2018, 8 pages including English Translation of the International Search Report.

*Primary Examiner* — Hirdepal Singh
(74) *Attorney, Agent, or Firm* — Xsensus, LLP

(57) ABSTRACT

Provided are an electronic device and method for wireless communication. The electronic device comprises: a processing circuit used to determine, for each user, a cooperation range of the user on the basis of a statistical model indicating distribution of access points within a pre-determined range around the user and a communication quality requirement of the user; and a set of cooperative access points for the user determined on the basis of the cooperation range, wherein an access point in the set of cooperative access points is assigned to the user to perform cooperative transmission.

17 Claims, 20 Drawing Sheets

(58) Field of Classification Search
USPC .................................................... 455/452.2
See application file for complete search history.

(56) References Cited

FOREIGN PATENT DOCUMENTS

| | | | |
|---|---|---|---|
| CN | 105744560 A | | 7/2016 |
| CN | 105744560 | * | 6/2019 |
| WO | 2011/008060 A2 | | 1/2011 |

* cited by examiner

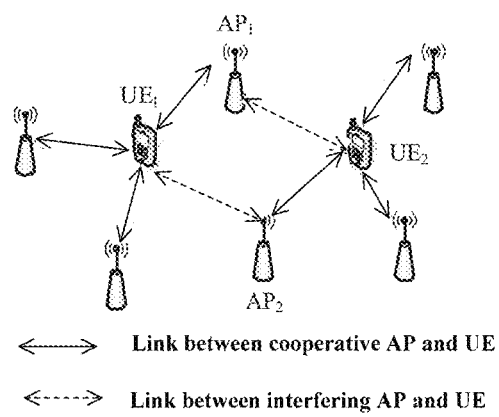
<——> Link between cooperative AP and UE
<----> Link between interfering AP and UE
Figure 6
|  | $UE_1$ |  | $UE_2$ |  | ... |  | $UE_K$ |
|---|---|---|---|---|---|---|---|
| $AP_{11}$ | $SIR_{11,1}$ | $AP_{21}$ | $SIR_{21,2}$ |  |  | $AP_{K1}$ | $SIR_{k1,K}$ |
| $AP_{12}$ | $SIR_{12,1}$ | $AP_{22}$ | $SIR_{22,2}$ |  |  | $AP_{K2}$ | $SIR_{k2,K}$ |
|  |  |  |  |  | $SIR_{ji,j}$ |  |  |
| $AP_{1N_1}$ | $SIR_{1N_1,1}$ | $AP_{2N_2}$ | $SIR_{2N_2,2}$ |  |  | $AP_{KN_K}$ | $SIR_{KN_K,K}$ |
Figure 7
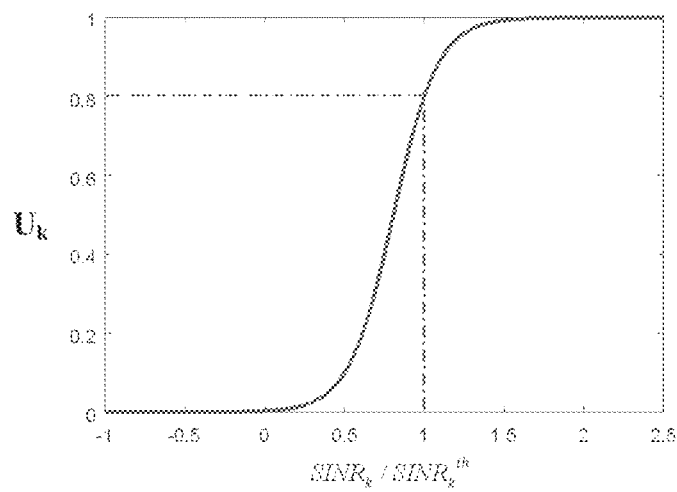
Figure 8

(a)

(b)

(a)

(b)

100# ELECTRONIC DEVICE AND METHOD FOR WIRELESS COMMUNICATION

CROSS-REFERENCE TO RELATED APPLICATIONS

The present application is based on PCT filing PCT/CN2018/085430, filed May 3, 2018, which claims the priority to Chinese Patent Application No. 201710330397.4, titled "ELECTRONIC DEVICE AND METHOD FOR WIRELESS COMMUNICATION", filed on May 11, 2017 with the China National Intellectual Property Administration, the entire contents of each are incorporated herein by reference.

FIELD OF THE DISCLOSURE

Embodiments of the present disclosure generally relates to the field of wireless communications, in particular to joint cooperation access point selection and spectrum allocation in a user centric network (UCN), and in more particular to an electronic device and method for wireless communications.

BACKGROUND OF THE DISCLOSURE

With the development of 5G communication technology, it is considered that an ultra-dense small cell network is a manner capable of satisfying an increasing demand for mobile data rate. By means of the dense and flexible configuration of the small cells, the UCN can be achieved, to support effective communication of mass mobile users and devices. In the UCN, for a user at any position, requirements on quality of service of the user can be satisfied with a high probability. Therefore, each of the users is allowed to select jointly multiple access points to perform cooperative transmission for example, tending to satisfy the requirement of each user. In the conventional resource management solution in which the network is taken as a center, it is intended to maximize utility of the whole network, and the wireless resources are facilitated to be allocated to a user with a good channel condition at a great probability, for example with the typical water-filling algorithm. For example, in a scenario including cells under the conventional cellular network architecture, powers are radiated around by taking a base station as a center, and a region which can be effectively covered is referred to as a cell. A user located in an effective coverage of a certain base station establishes connection with the base station, and switches to another base station when the user leaves the effective coverage. The base station allocates resources for the users in its coverage range, so as to optimize the overall performance of the network.

In the conventional cellular network architecture in which the network is taken as the center, the number of users is much greater than the number of base stations. Users located at an edge of the cell would suffer stronger inter-cell interferences. The requirements of such users are difficult to be satisfied if no cooperation is performed with other base stations. With the regular configuration of the network, it is easy to select a cooperative base station. In the ultra-dense small cell network, the number of access points (APs) with a low transmission power is equivalent to the number of users, and configuration of the APs is flexible and does not follow any rule. Therefore, it is difficult to select cooperative base stations to satisfy the requirement on quality of service of each user.

SUMMARY OF THE DISCLOSURE

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic device for wireless communications is provided, which includes processing circuitry. The processing circuitry is configured to: determine, with respect to each user, based on a statistical model representing a distribution of access points in a predetermined range around the user and a communication quality requirement of the user, a cooperation range of the user; and determine, based on the cooperation range, an access points cooperation set of the user, where an access point in the access points cooperation set is allocated to the user to perform cooperative transmission.

According to another aspect of the present disclosure, an electronic device for wireless communications is provided, which includes processing circuitry. The processing circuitry is configured to: acquire a statistical model representing a distribution of access points in a predetermined range around a user; and determine, based on the statistical model and a communication quality requirement of the user, a cooperation range of the user, which is provided to a management apparatus for use in allocation of access points for the user.

According to another aspect of the present disclosure, an electronic device for wireless communications is provided, which includes processing circuitry. The processing circuitry is configured to: acquire location information and a communication quality requirement of a user and a statistical model representing a distribution of access points in a predetermined range around the user; and determine, based on the statistical model and the communication quality requirement of the user, a cooperation range of the user, which is provided to a management apparatus for use in allocation of access points for the user.

According to another aspect of the present disclosure, a method for wireless communications is provided, which includes: determining, with respect to each user, based on a statistical model representing a distribution of access points in a predetermined range around the user and a communication quality requirement of the user, a cooperation range of the user; and determine, based on the cooperation range of the user, an access points cooperation set of the user, where an access point in the access points cooperation set is allocated to the user to perform cooperative transmission.

According to another aspect of the present disclosure, a method for wireless communications is provided, which includes: acquiring a statistical model representing a distribution of access points in a predetermined range around a user; and determining, based on the statistical model and a communication quality requirement of the user, a cooperation range of the user, which is provided to a management apparatus for use in allocation of access points for the user.

According to another aspect of the present disclosure, an electronic device for wireless communications is further provided, which includes: acquiring location information and a communication quality requirement of a user and a statistical model representing a distribution of access points in a predetermined range around the user; and determining, based on the statistical model and the communication quality requirement of the user, a cooperation range of the user, which is provided to a management apparatus for use in allocation of access points for the user.

According to other aspects of the present disclosure, there are further provided computer program codes and computer program products for implementing the methods above, and a computer readable storage medium having recorded thereon the computer program codes for implementing the methods described above.

With the electronic device and method according to the present disclosure, access points can be selected quickly and effectively for users having different requirements on quality of service, thereby improving usage efficiency of the access points in a case of satisfying requirements on the quality of service of the users.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. in the accompanying drawings:

FIG. 6 shows an example of an access points cooperation set;

FIG. 7 shows an example of an SIR table;

FIG. 8 shows a graph of an example of a utility function;

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
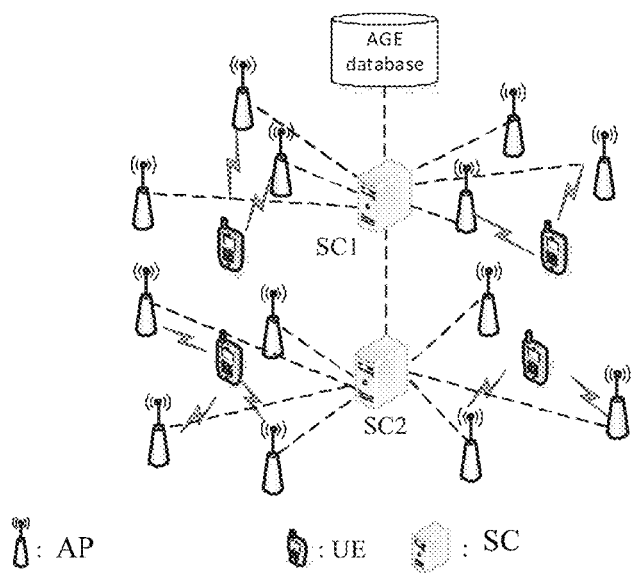
FIG. 1 shows a schematic scenario diagram of UCN.

As described above, how to select a joint cooperation access point (AP) for a user in the UCN generates a significant influence on a communication quality of a system and usage efficiency of access points. FIG. 1 shows a schematic scenario diagram of the UCN. There are multiple APs around the user equipment (UE). The UE performs cooperative transmission by selecting the AR Each AP is communicatively connected to a spectrum management apparatus such as a spectrum coordinator (SC). The SC allocates spectrum for AP-UE pairs. It can be seen that compared with the conventional cellular network architecture, the feature of the network architecture shown in FIG. 1 lies in that the number of APs is great, even greater than the number of UEs.

The AP described herein may be any node providing a network communication service, such as a base station, a small base station and a mobile base station. The base station may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the base station may be implemented as any other types of base station, such as NodeB and a base station transceiver station (BTS). The base station may include: a body configured to control wireless communications (also referred to as a base station device); and one or more remote radio head ends (RRH) arranged at a position different from a position of the body. In addition, various types of terminals described below may function as base stations to operate by performing functions of the base stations temporarily or in a semi-persistent manner.

The UE or the user may be any terminal device or a wireless communication device providing services. For example, the terminal device may be implemented as a mobile terminal (such as a smart phone, a tablet personal computer (PC), a notebook PC, a portable game terminal, and a portable/dongle mobile router and a digital camera), or a vehicle-mounted terminal (such as a vehicle navigation device). The terminal device may also be implemented as a terminal performing machine to machine (M2M) communication (also referred to as a machine type communication (MTC) terminal). In addition, the terminal device may be a wireless communication module installed on each of the above terminals (such as an integrated circuit module including a single wafer).

Figure 2:
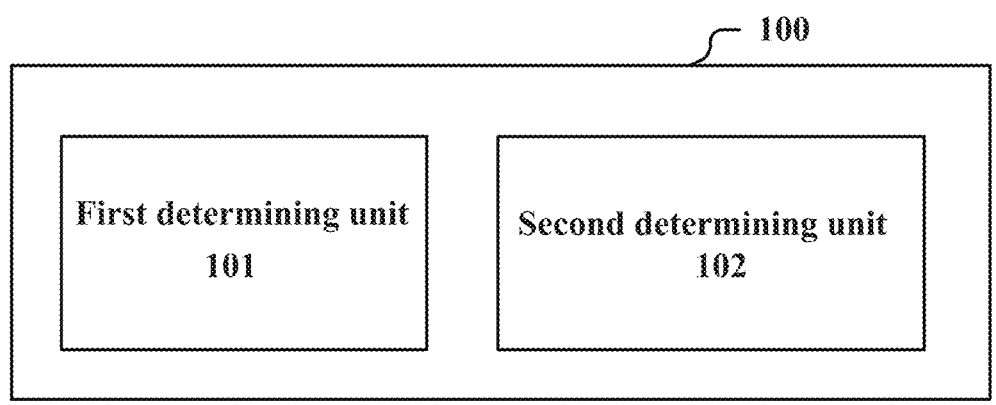
FIG. 2 shows a block diagram of functional modules of an electronic device for wireless communications according to an embodiment of the present disclosure.

For the selection of access points, an electronic device 100 for wireless communications is provided according to the present embodiment. FIG. 2 shows a block diagram of functional modules of the electronic device 100. As shown in FIG. 2, the electronic device 100 includes a first determining unit 101 and a second determining unit 102. The first determining unit 101 is configured to determine, with respect to each user and based on a statistical model representing a distribution of access points within a predetermined range around the user and a communication quality requirement of the user, a cooperation range of the user. The second determining unit 102 is configured to determine an access points cooperation set of the user based on the cooperation range. An access point in the access points cooperation set is allocated to the user to perform cooperative transmission.

The first determining unit 101 and the second determining unit 102 may be implemented by one or more processing circuitries. The processing circuitry may be implemented as a chip, for example. The electronic device 100 may be arranged in a management apparatus (that is, SC) shown in FIG. 1, or may be communicatively connected to the SC.

The first determining unit 101 may construct a statistical model or determine parameters of a predetermined statistical model based on an actual distribution of the access points. Specifically, the first determining unit 101 can acquire geographic location information of each access point and geographic location information of each user. Based on the information, the first determining unit 101 can fit a statistical geometric model of a distribution of the access points. Alternatively, in a general case, the statistical geometric Poisson Point Process (PPP) model may be selected as the statistical geometric model, for example. The first determining unit 101 may determine a strength parameter $\lambda_a$ of the PPP model based on the above geometric location information, thereby determining a statistical model of the distribution of the access points.

In addition, in order to improve the calculation efficiency or in a case that the distribution of the access points is substantially uniform, the first determining unit 101 may adopt a same statistical model having same parameters for all users, that is, the cooperation range of the user depends on only a communication quality requirement of the user. In another aspect, in a case that the distribution of the access points is fixed, a model may be established in advance for the distribution of the access points. In such example, for example, the established statistical model may be pre-stored in a memory, and is to be used by the first determining unit 101.

The communication quality requirement of the user may be represented by a signal to interference and noise ratio (SINR) threshold, for example. In a case that the SINR of the user is above the threshold, it is considered that the communication quality requirement of the user is satisfied. The SINR is used as a parameter for evaluating the communication quality of the user in the following description. It should be understood that, other parameters which can represent the communication quality of the user may also be used, and the parameters are not limited herein.

For each user, the first determining unit 101 determines the cooperation range of the user based on the statistical model and the communication quality requirement of the user. Access points in the cooperation range of the user may function as candidate access points which the user may access in. In other words, these access points may provide a useful signal with sufficient strength to the user. The second determining unit 102 may further determine an access points cooperation set in the cooperation range, according to a specific rule or standard for example. According to the specific rule or standard, compared with the other access points in the cooperation range, better performance can be provided when an access point in the determined access points cooperation set is allocated to the user for cooperative transmission. In an example, the access point in the access points cooperation set can provide a useful signal with sufficient strength, and does not generate interferences on other users.

When determining the cooperation range of the user, the first determining unit 101 may calculate SINR of the user according to the statistical model, for example. For example, it may be assumed that the AP in the cooperation range can provide a useful signal for the user, and the AP outside of the cooperation range would provide an interference signal for the user. In this case, a range of the APs with which the SINR of the user is just above the SINR threshold of the user may be acquired as the cooperation range, and APs in the cooperation range may be selected to form the access points cooperation set.

In an example, the first determining unit 101 is further configured to determine, with respect to each user, an interference range of the user based on the cooperation range of the user. An access point in the interference range of the user generates interferences to the user when serving another user.

Figure 3:
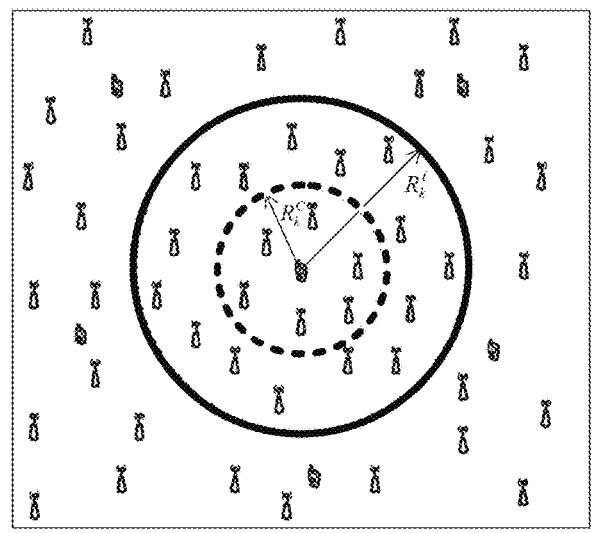
FIG. 3 shows a schematic example of AP distribution.

For example, the cooperation range and the interference range may be respectively represented by a cooperation radius and an interference radius. FIG. 3 shows a schematic example of a distribution of APs. In FIG. 3, the distribution of APs conforms to the PPP model and the strength parameter is $\lambda_a$. In FIG. 3, user k is taken as an example, a circular range covered by dashed lines is the cooperation range, and an annular range between solid lines and dashed lines is the interference range. The cooperation range and the interference range may be respectively represented by radius $R_k^C$ and $R_k^I$ in FIG. 3.

For example, a ratio m of the interference radius $R_k^I$ to the cooperation radius $R_k^C$ may be set according to a ratio of a received useful signal threshold to a received interference signal threshold of a transceiver of the user, and the cooperation radius and the interference radius are determined based on the ratio m. It should be understood that, the parameter may be further optimized. Taking the user k as an example, the ratio of the interference radius to the cooperation radius of the user is shown by the following equation (1):

$$m_k = R_k^I / R_k^C = \left(\frac{P_D^{th}}{P_I^{th}}\right)^{\frac{1}{\alpha}}. \quad (1)$$

$P_D^{th}$ represents a received useful power threshold, which may be set as a signal 3 dB or more higher than a noise level for example; and $P_I^{th}$ represents a received interference power threshold, which may be set as a signal 3 dB or more lower than a noise level for example.

Referring to FIG. 3, in order to estimate a lower limit value of the cooperation radius of the user k, a scenario with the worst SINR is considered. It is assumed that APs in the annular interference range each function as an interfering AP of the user k ($\eta=1$), $\eta$ represents the usage efficiency of the APs in the interference range. In order to satisfy the communication quality requirement of the user k, the following equation (2) should be satisfied, that is, the SINR of the user calculated based on the statistical model is caused to be greater than or equal to the SINR threshold:

$$SINR_k = \frac{\sum_{i \in \Phi_{C(k)}} P_i \beta (d_{ik})^{-\alpha}}{\sum_{j \in \Phi_{I(k)}} P_j \beta (d_{jk})^{-\alpha} + \sigma_k^2} \geq SINR_k^{th}. \quad (2)$$

$SINR_k$ represents the estimated SINR of the k-th user, $SINR_k^{th}$ represents the SINR threshold of the k-th user, $\Phi_{C(k)}$ represents a cooperation AP set of the k-th user, $\Phi_{I(k)}$ represents an interference AP set of the k-th user, $P_i$ represents a signal emission power of the i-th access point, $\beta$ represents a path loss of a free space at $d_0$ ($d_0=1m$), $\alpha$ represents a path loss index, $d_{ik}$ represents a distance between the i-th access point and the user k, and $\sigma_k^2$ represents a noise power at the receiver of the user which depends on a signal bandwidth and the noise figure at the receiver of the user. As shown by the equation (2), the first determining unit 101 may calculate the SINR of the user based on the above PPP model, and calculate the cooperation radius of the user by causing the calculated SINR to be greater than or equal to the SINR threshold, as shown by the following equation (3):

$$SINR_k = \frac{\int_0^{2\pi} \int_0^{R_k^C} P_t \cdot \beta \cdot r^{-\alpha} \cdot \lambda_a \cdot r \cdot dr d\theta}{\int_0^{2\pi} \int_0^{R_k^I} P_t \cdot \beta \cdot r^{-\alpha} \cdot \eta \cdot \lambda_a \cdot r \cdot dr d\theta + \sigma_k^2} \quad (3)$$

$$= \frac{2\pi \int_1^{R_k^C} \lambda_a \cdot P_t \cdot \beta \cdot r^{-1} \cdot dr}{2\pi \int_{R_k^C}^{R_k^I} \eta \cdot \lambda_a \cdot P_t \cdot \beta \cdot r^{-1} \cdot dr + \sigma_k^2}$$

$$= \frac{2\pi \lambda_a P_t \beta (\ln r)_1^{R_k^C}}{2\pi \eta \lambda_a P_t \beta (\ln r)_{R_k^C}^{R_k^I} + \sigma_k^2}$$

$$= \frac{2\pi \lambda_a P_t \beta \ln R_k^C}{2\pi \eta \lambda_a P_t \beta \ln m + \sigma_k^2} \geq SINR_k^{th}$$

It is assumed that emission powers of APs in the cooperation range and in the interference range each are $P_t$. Let $q=2\pi\lambda_a P_t \beta$, an estimation value of the cooperation radius of the user k can be obtained by the following equation (4):

$$\ln R_k^C \geq SINR_k^{th} \cdot \left(\eta \ln m + \frac{\sigma_k^2}{q}\right) \quad (4)$$

$$R_k^C \geq \exp\left\{SINR_k^{th} \cdot \left(\eta \ln m + \frac{\sigma_k^2}{q}\right)\right\}$$

Figure 4:
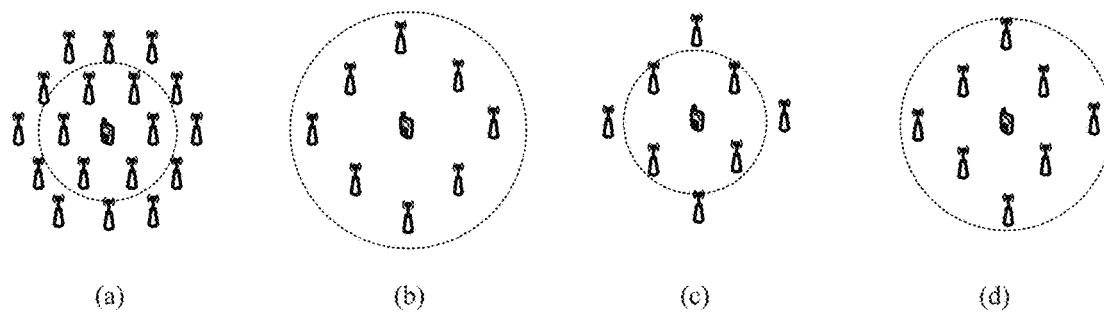
FIG. 4 shows a schematic example of a relationship among a cooperation radius, an AP density and a communication quality requirement of a user.

It may be seen from the above equation (4) that, the larger a density of APs around the user is (that is, the larger $\lambda_a$ is), the smaller the cooperation radius is. In a case of the same AP density, the higher the communication quality requirement of the user is (the larger $SINR_k^{th}$ is), the larger the cooperation radius is. FIG. 4 shows a schematic example of a relationship among the cooperation radius, the AP density and the communication quality requirement of the user. It is assumed that the APs adopt the same emission power, the path losses of the free spaces are the same, the path loss indexes are the same, and the receivers of the users have the same noise figure. In (a) and (b) of FIG. 4, the user has the same communication quality requirement, but the AP density of the user in (a) of FIG. 4 is higher than the AP density of the user in (b) of FIG. 4. Therefore, the cooperation radius of the user in (a) of FIG. 4 is relatively smaller. In (c) and (d) of FIG. 4, the user has the same AP density, but the communication quality requirement of the user in (d) of FIG. 4 is higher than the requirement of quality of service of the user in (c) of FIG. 4. Therefore, the cooperation radius of the user in (d) of FIG. 4 is relatively larger.

In addition, it is assumed that the beamforming technology is adopted and the random beamforming includes $N_d$ possible beam directions (a beam width is $2\pi/N_d$), and an array gain is G. In order to achieve the same performance as that in a case of not adopting random beamforming, the density of the access points should be $\lambda_a \cdot N_d$. Accordingly, in the equation (4), q should be modified to be $$q = 2\pi \cdot \frac{\lambda_a}{N_d} P_t g \beta,$$

where g indicates a linear value of the array gain.

Figure 5:
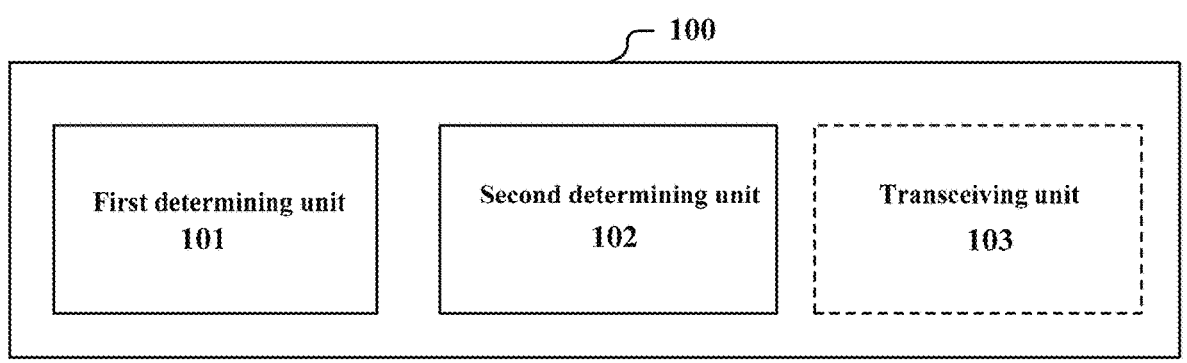
FIG. 5 shows a block diagram of functional modules of an electronic device for wireless communications according to an embodiment of the present disclosure.

As described above, location information of the user and information on the communication quality requirement of the user are required to determine the cooperation range and the interference range. Therefore, as shown in FIG. 5, the electronic device 100 may further include a transceiving unit 103 configured to receive location information and the communication quality requirement of each user. The transceiving unit 103 may be implemented as a transceiver and an antenna, for example.

In addition, the transceiving unit 103 may be further configured to receive at least one of the following: information on a received useful signal threshold and a received interference signal threshold of each user, and location information and maximum emission power information of each access point. Alternatively, the location information and the maximum emission power information of each access point may be pre-stored in a memory when the system is initialized.

Communication between the transceiving unit 103 and the user may be performed in a wireless manner or may be forwarded via the AP. Communication between the transceiving unit 103 and the AP may be performed in a wired or wireless manner.

After the cooperation range and the interference range of each user are determined, the second determining unit 102 may for example determine, with respect to each user, an access points cooperation set based on the cooperation range of the user and an interference range of another user. For example, the second determining unit 102 selects access points located in the cooperation range of the user and outside of an interference range of any other user to form the access points cooperation set of the user. In other words, the access point in the access points cooperation set can provide a useful signal with sufficient strength for the user, and does not generate interferences on another user. It is assumed that the total number of APs is N, a full set of the APs is represented as $\Omega$, the total number of users is K, and the access points cooperation set of the k-th user may be represented by:

$$\Omega_{C(k)} = \{1 \leq i \leq N \mid d_{ik} \leq R_k^D\} \quad (5)$$

$$\Omega_{I(k)} = \{1 \leq j \leq N \mid d_{jk} \leq R_k^I\}$$

$$\Phi_{C(k)} = \Omega_{C(k)} \cap \overline{\bigcup_{m=1, m \neq k}^{K} \Omega_{I(m)}}$$

$\Omega_{C(k)}$ represents all APs located in the cooperation radius of the user k, $\Omega_{I(k)}$ represents all APs located in the interference radius of the user k, $$\bigcup_{m=1, m \neq k}^{K} \Omega_{I(m)}$$

represents a union set of APs which may generate interferences on all users other than the user k, and the symbol "—" on its above represents an operation for calculating a complementary set.

FIG. 6 shows an example of an access points cooperation set. $AP_1$ is located in a cooperation radius range of $UE_1$, and is also located in an interference radius range of $UE_2$. Therefore, the $AP_1$ is not included in the access points cooperation set of $UE_1$. $AP_2$ is located in a cooperation radius range of $UE_2$ and is located in an interference radius range of the $UE_1$. Therefore, the $AP_2$ is not included in the access points cooperation set of the $UE_1$. For example, the user may randomly or arbitrarily select the access point in the access points cooperation set to perform cooperative transmission. In this way, the allocation of the cooperative APs to each user is performed.

It is assumed that all APs operate on the same channel and each user may select a set of cooperative APs, but each AP can serve only one user at the same time slot. In an example, the user randomly selects the access point in the access points cooperation set to perform cooperative transmission, and continuously increases the number of the cooperative APs, until the communication quality requirement of the user such as the SINR threshold is achieved. If the communication quality requirements of all users are satisfied, the operation ends. If there is a user whose communication quality requirement cannot be satisfied, a new channel (or spectrum) is allocated to the user, and the allocation process of the cooperative APs is repeated. In other words, in a case that there is a user whose communication quality requirement is not satisfied when the first determination unit 101 and the second determination unit 102 complete allocation of the access points for all users, an access point is allocated for the user whose communication quality requirement is not satisfied on a new frequency band.

After the access point allocation and the spectrum allocation for all users are completed, the transceiving unit 103 may notify the access point of the allocating result, such as an AP-UE pair to cooperate and a corresponding spectrum to be used by the AP-UE pair, to perform cooperative communication.

In summary, the electronic device 100 according to the present embodiment allocates the cooperative APs based on the statistical model of the APs and the communication quality requirements of the users, and can select an appropriate AP (APs) for each user quickly and effectively, thereby improving the usage efficiency of the access points in a case of satisfying the communication quality requirement of each user.

Second Embodiment

In the present embodiment, the second determining unit 102 may further select an access point for cooperative transmission from among the access points cooperation set, based on a ratio of a useful signal provided for a user by the access point to total interferences generated by the access point to other users (referred to as SIR hereinafter). In this way, the second determining unit 102 may select, for example, an access point with the maximum to ratio; and/or the second determining unit 102 may select a UE-AP pair which is most beneficial to improve the overall communication quality.

In an example, the second determining unit 102 may calculate the ratio SIR based on location information of each user and the access point as well as an emission power of the access point. In other words, the above ratio is not obtained by measuring, but is obtained by estimating based on the existing parameters. The ratio may be specifically calculated according to the following equation (6), for example:

$$SIR_{ji,j} = \frac{P_{ji}\beta(d_{ji,j})^{-\alpha}}{\sum_{k=1,k\neq j}^{K} P_{ji}\beta(d_{ji,j})^{-\alpha}} \quad (6)$$

It is assumed that the access points cooperation set of the k-th user includes $N_k$ APs, $SIR_{ji,j}$ represents a ratio of a useful signal provided to the user j ($UE_j$) by an i-th cooperation access point $AP_{ji}$ in the access points cooperation set of the user j to the total interference power generated to other users by $AP_{ji}$, in a case that the $AP_{ji}$ functions as the cooperative AP of $UE_j$, $P_{ji}$ represents an emission power of the $AP_{ji}$, and $d_{ji,k}$ represents a distance from the $AP_{ji}$ to the k-th user.

For example, SIRs are calculated for each user and each access point in the access points cooperation set of each user, and an SIR table is constructed based on these SIRs. The second determining unit 102 performs the cooperative APs allocation for all users with this table. FIG. 7 shows an example of the SIR table. In FIG. 7, there are K users in total, and the access points cooperation set of the k-th user includes $N_k$ APs.

In an example, the second determining unit 102 is configured to repeat the following operations when allocating the access points for each user: selecting, from among user and access point pairs formed by the access point corresponding to the largest ratio of each user and the user, a user and access point pair which generates the largest enhancement in a sum utility value for all users, and not taking this user and access point pair into consideration in the next allocation. The sum utility value reflects overall communication quality for all the to users.

Specifically, the second determining unit 102 selects an AP with the maximum SIR for each user based on the SIR table, and the AP and the user form the AP-UE pair of the user. Then, an AP-UE pair which can generate the largest enhancement in a sum utility value for all users is selected from among the AP-UE pairs of all users, and the AP is allocated to the corresponding UE.

The above operations are repeated, and the allocation of the access point to the user is stopped when the communication quality requirement of the user is satisfied. For example, when the SINR of the user satisfies $SINR_k \geq (1+\Delta) SINR_k^{th}$, k=1,2, ..., K, the allocation of the AP to the user is stopped, where $\Delta$ represents a preset margin.

If the sum utility value of all users converges or begins to decrease, the overall allocation process of the APs is stopped. Otherwise, the selection of the AP-UE pair based on the SIR table and the allocation of the APs are repeated.

As described above, the sum utility value reflects the overall communication quality of all users. Therefore, the above configuration indicates that the allocation process is stopped, when the overall communication quality cannot be enhanced or even reduced by continuing allocating the APs. Similarly, if there is a user whose communication quality requirement is not satisfied, the first determining unit 101 and the second determining unit 102 may allocate an access point for the user whose communication quality requirement is not satisfied on a new frequency band.

For example, the sum utility value is a function of the communication quality of the user, and the communication quality of the user is obtained by calculating based on location information of the user and each access point as well as an emission power of each access point. For example, the communication quality of the user may be expressed by the SINR shown in the equation (2).

In an example, the sum utility value is a sum result of utility values of all users. The utility value of the user may be calculated according to a utility function. For example, the utility function is a non-linear transformation of $SINR_k/SINR_k^{th}$. An example of the utility function is shown by the following equation (7):

$$U_k = f_k(SINR_k, SINR_k^{th}) = \frac{1}{2} \times \left\{ \tanh\left\{\xi \times \left(\frac{SINR_k}{SINR_k^{th}} - \varepsilon\right)\right\} + 1 \right\}. \quad (7)$$

$U_k$ represents the utility function of the user k, tanh ( ) represents the hyperbolic tangent function, $\xi$ represents an expansion factor (which may be 3.5834 for example), and $\varepsilon$ represents a symmetry center (which may be 0.8064 for example). FIG. 8 shows a graph of the utility function, in which, the horizontal axis represents $SINR_k/SINR_k^{th}$, a unit of the SINR is dB, and the vertical axis represents the utility function $U_k$.

It can be seen that the characteristic of the utility function lies in that: the utility function is extremely sensitive to the change of the SINR value in a case that the user does not achieve its SINR threshold, so that the user can quickly achieve its SINR threshold by allocating the APs. In a case that the SINR of the user exceeds the SINR threshold, the curve of the utility function changes relatively slow, thereby avoiding allocating excessive resources for the user. It should be understood that only an example of the utility function is given above, and the utility function which may be adopted is not limited herein.

Similar to the first embodiment, after the access point allocation and the spectrum allocation for all users are completed, the transceiving unit 103 may notify the access point of the allocating result, such as an AP-UE pair to cooperate and a corresponding spectrum to be used by the AP-UE pair, to perform cooperative communication.

The electronic device 200 according to the present embodiment further optimizes the allocation of the access points for each user by use of the SIR table and the utility function, thereby effectively reducing interferences between cooperation sets of different users, and improving the usage efficiency of the access point in a case of satisfying the communication quality requirement of the user.

Figure 9:
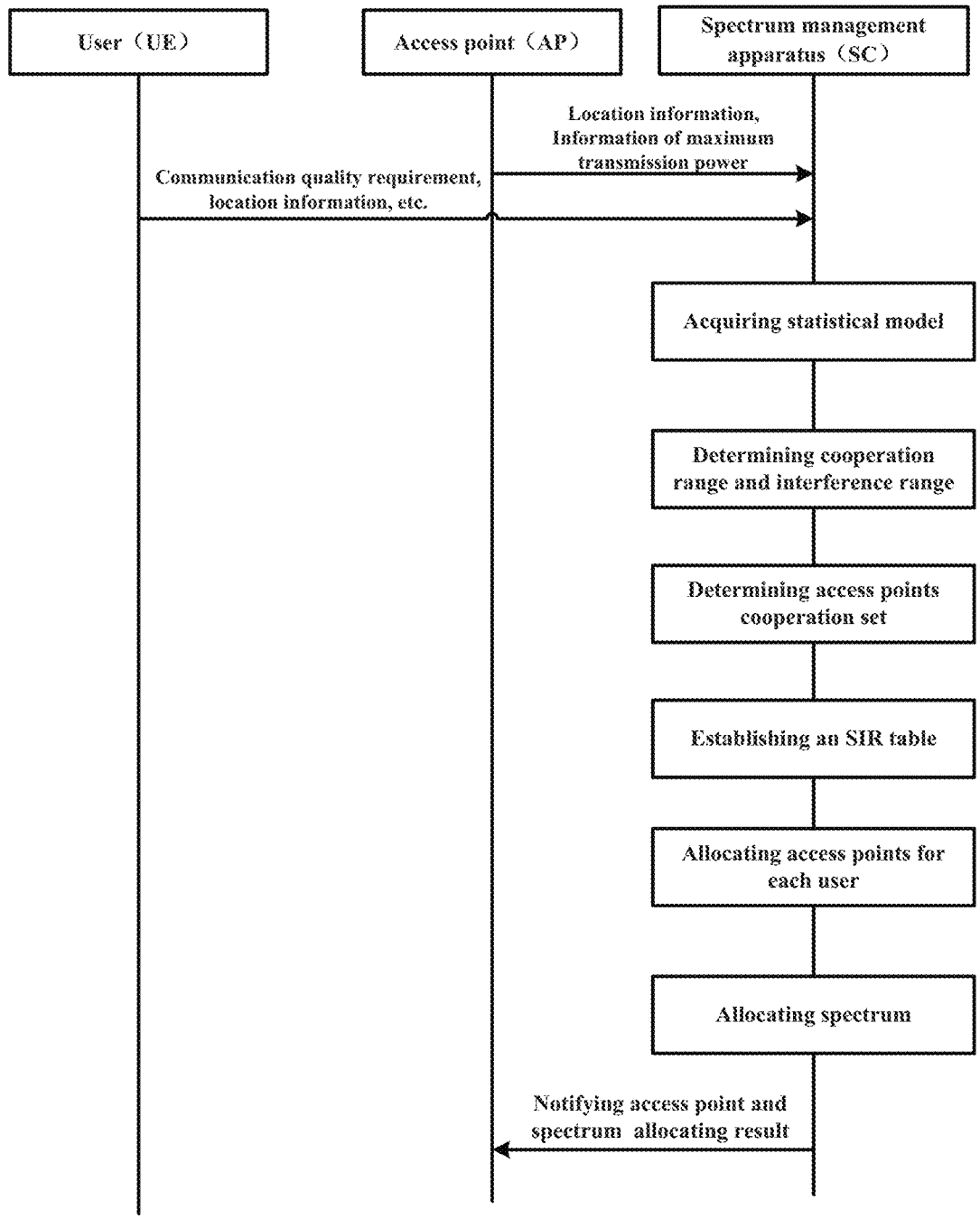
FIG. 9 shows a schematic diagram of an information procedure among a user, an access point and a spectrum management apparatus.

In order to facilitate understanding, FIG. 9 shows a schematic diagram of the information procedure among user equipment (UE), an access point (AP) and a spectrum management apparatus (SC), in a case that the electronic device 200 is arranged on the spectrum management apparatus (such as a spectrum coordinator).

Firstly, each UE, reports its location information and communication quality requirement such as the SINR threshold to the SC. In addition, the UE may further report, its received useful signal threshold and received interference signal threshold. Each AP reports its location information and the maximum emission power to the SC. The SC obtains a statistical geometric model of a distribution of APs around all UEs based on the location information of the APs and the location information of the UEs, for example. Subsequently, the SC calculates the cooperation range and the interference range of each UE, such as the cooperation radius and the interference radius, according to the statistical geometric model and the communication quality requirement of the UE. The SC may further determine the access points cooperation set of the user based on the cooperation range of the user and an interference range of another user, for example, selecting access points located in the cooperation range of the user and outside of the interference range of any other user to form the access points cooperation set of the user. In addition, the SC may further establish an SIR table, and allocates the access point for each user based on the SIR table and a sum utility value of all users, as described above. The access points are allocated for the same spectrum. In a case that the spectrum cannot satisfy the requirements of all users, the access points are allocated continuously for other spectrums. Finally, the SC notifies the AP of the access point allocating result, such as the AP-UE pair, and the spectrum allocation result such as the spectrum corresponding to the AP-UE pair, so that the AP and the UE perform cooperative communication based on these results.

It should be understood that, the information procedure shown in FIG. 9 is only schematic rather than restrictive.

Third Embodiment

Figure 10:
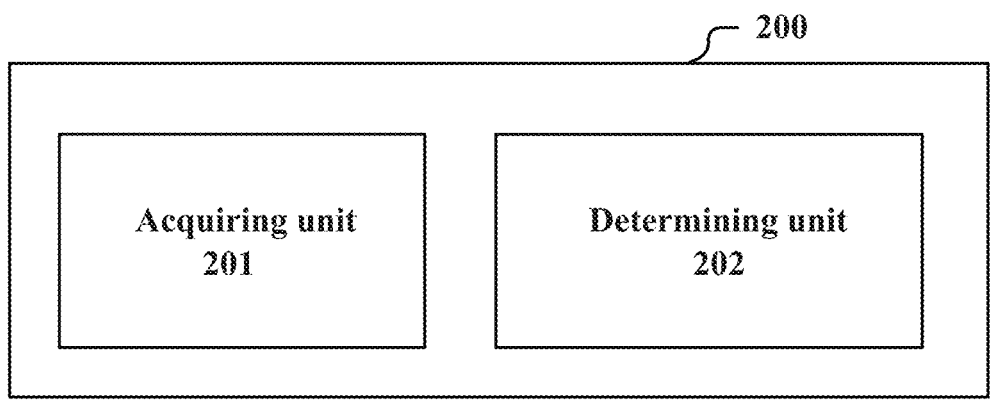
FIG. 10 shows a block diagram of functional modules of an electronic device for wireless communications according to another embodiment of the present disclosure.

FIG. 10 shows a block diagram of functional modules of an electronic device 200 for wireless communications according to another embodiment of the present disclosure. The electronic device 200 includes an acquiring unit 201 and a determining unit 202. The acquiring unit 201 is configured to acquire a statistical model representing a distribution of access points in a predetermined range around a user. The determining unit 202 is configured to determine a cooperation range of the user based on the statistical model and a communication quality requirement of the user. The cooperation range of the user is provided to a management apparatus for use in allocation of access points for the user.

The acquiring unit 201 and the determining unit 202 may be implemented by one or more processing circuitries. The processing circuitry may be implemented as a chip, for example. The electronic device 200 may be arranged on user equipment UE shown in FIG. 1 for example, or may be communicatively connected to the UE.

For example, the acquiring unit 201 may acquire the above statistical model from the management apparatus. In this case, the electronic device 200 may further include a transceiving unit (not shown in FIG. 10) configured to receive information on the statistical model from the management apparatus. In an example, the transceiving unit may further send the location information of the user to the management apparatus, so that the management apparatus accurately determines the statistical model (or its parameters) to be provided to the user. In addition, in a case that the distribution of the APs is fixed, the acquiring unit 201 may further acquire related information from a memory which pre-stores the distribution of the APs or the statistical geometric model of the APs, and acquires the statistical model of a distribution of access points within a predetermined range around the user based on the related information. The memory may be located on a user side or a management apparatus side.

After acquiring the statistical model, the determining unit 202 may determine the cooperation range of the user such as the cooperation radius based on the statistical model and the communication quality requirement of the user such as the SINR threshold. Access points in the cooperation range of the user may function as candidate access points to be allocated to the user. In other words, the access point in the cooperation range of the user may provide a useful signal with sufficient strength for the user.

In addition, the determining unit 202 may further determine an interference range of the user based on the cooperation range of the user. An access point in the interference range of the user generates interferences on the user when serving another user. The interference range of the user is also provided to the management apparatus for use in allocation of the access points for the user. The determining unit 202 may determine the cooperation range and the interference range by adopting the same manner as that in the first embodiment, and the specific manner is not repeated herein.

After each user provides respective cooperation range and interference range to the management apparatus, the management apparatus may determine an access points cooperation set based on the information. Further, the management apparatus establishes an SIR table based on location information of each UE and AP as well as the maximum emission power of the AP, and perform fine allocation of the access points based on the SIR table. For the determination of the access points cooperation set and the fine allocation of the access points, one may refer to the first embodiment and the second embodiment, and details are not repeated herein.

The electronic device 200 according to the present embodiment can quickly determine an access point which may be allocated to the user based on the statistical model of the access points and the communication quality requirement of the user, thereby improving the allocation efficiency and the usage efficiency of the access points in a case of satisfying the communication quality requirement of the user.

Fourth Embodiment

Figure 11:
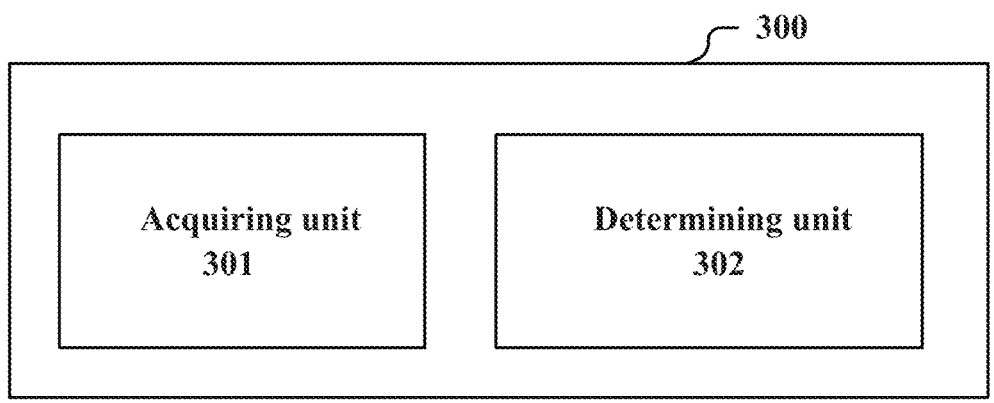
FIG. 11 shows a block diagram of functional modules of an electronic device for wireless communications according to another embodiment of the present disclosure.

FIG. 11 shows a block diagram of functional modules of an electronic device 300 for wireless communications according to another embodiment of the present disclosure. The electronic device 300 includes an acquiring unit 301 and a determining unit 302. The acquiring unit 301 is configured to acquire location information and a communication quality requirement of a user, and a statistical model representing a distribution of access points within a predetermined range around the user. The determining unit 302 is configured to determine a cooperation range of the user based on the statistical model and the communication quality requirement of the user. The cooperation range of the user is provided to a management apparatus for use in allocation of the access points for the user.

The acquiring unit 301 and the determining unit 302 may be implemented by one or more processing circuitries. The processing circuitry may be implemented as a chip, for example. The electronic device 300 may be arranged in the access point AP shown in FIG. 1, for example, or may be communicatively connected to the AP.

For example, the user may provide its location information and communication quality requirement to a closest access point, so that the electronic device 300 corresponding to the access point performs the above operation on the user. The electronic device 300 may further include a transceiving unit (not shown in FIG. 11) configured to receive location information and the communication quality requirement information of the user from the user. In addition, the acquiring unit 301 may acquire the statistical model from the management apparatus. In this case, the transceiving unit is further configured to receive information on the statistical model from the management apparatus. In an example, the transceiving unit may transmit the location information of the user to the management apparatus, so that the management apparatus accurately determines the statistical model (or its parameters) to be provided to the user. In another aspect, in a case that the distribution of the APs is substantially fixed, the acquiring unit 301 may further acquire related information from a memory which pre-stores the distribution of the APs or the statistical geometric model of the APs, and acquires the statistical model of the distribution of the access points within a predetermined range around the user based on the related information. The memory may be located on an AP side or a management apparatus side, for example.

After obtaining the above statistical model, the determining unit 302 may determine the cooperation range of the user such as a cooperation radius, based on the statistical model and the communication quality requirement of the user such as the SINR threshold. Access points in the cooperation range of the user may function as candidate access points to be allocated to the user. In other words, the access point in the cooperation range of the user may provide a useful signal with sufficient strength to the user.

In addition, the determining unit 302 may further determine an interference range of the user based on the cooperation range of the user. An access point in the interference range of the user would generate interferences on the user when serving another user. The interference range of the user is also provided to the management apparatus for use in allocation of the access points for the user. The determining unit 302 may determine the cooperation range and the interference range by adopting the same manner as that in the first embodiment, and details are not repeated herein.

After the cooperation range and the interference range of each user are provided to the management apparatus, the management apparatus may determine an access points cooperation set based on the information. Further, the management apparatus further establishes an SIR table based on location information of each UE and AP as well as a maximum emission power of the AP, and perform fine allocation of the access points based on the SIR table. For the determination of the access points cooperation set and the fine allocation of the access points, one may refer to the description of the first embodiment and the second embodiment, and details are not repeated herein.

The electronic device 300 according to the present embodiment can quickly determine the access points which may be allocated to the user based on the statistical model of the access points and the communication quality requirement of the user, thereby improving the allocation efficiency and the usage efficiency of the access point in a case of satisfying the communication quality requirement of the user.

Fifth Embodiment

In the process of describing the electronic devices for wireless communications in the embodiments described above, obviously, some processing and methods are also disclosed. Hereinafter, an overview of the methods is given without repeating some details disclosed above. However, it should be noted that, although the methods are disclosed in a process of describing the electronic devices for wireless communications, the methods do not certainly employ or are not certainly executed by the aforementioned components. For example, the embodiments of the electronic devices for wireless communications may be partially or completely implemented with hardware and/or firmware, the method described below may be executed by a computer-executable program completely, although the hardware and/or firmware of the electronic devices for wireless communications can also be used in the methods.

Figure 12:
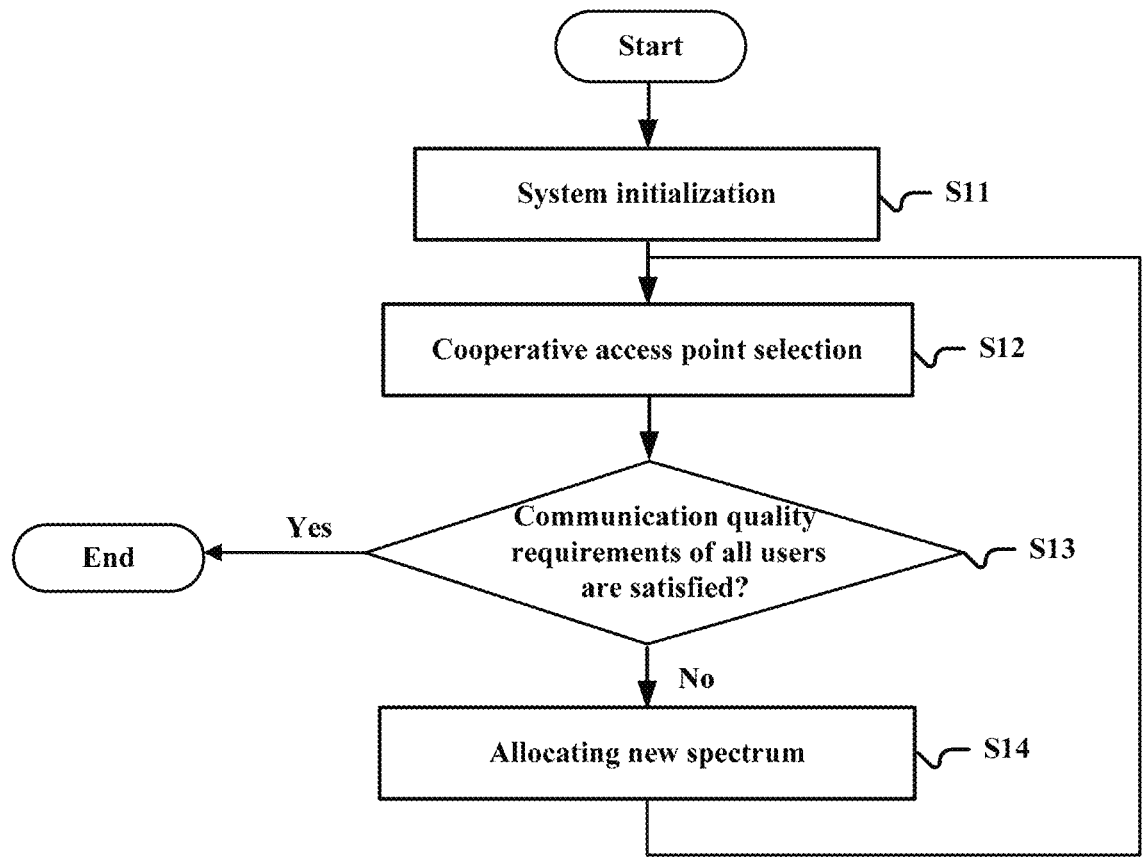
FIG. 12 shows a schematic flowchart of joint access point selection and spectrum allocation in a UCN network.

As described above, in the UCN network, the joint selection of the access point and the allocation of the spectrum may be performed as follows. As shown in FIG. 12, after a system is initialized (S11), a cooperation access point selection for a user is performed for a same spectrum (S12). If communication quality requirements of all users are satisfied (S13: Yes), the access point selection processing is stopped; otherwise (S13: No), a new spectrum is allocated for a user whose communication quality requirement is not satisfied (S14), and the above cooperation access point selection processing is repeated (S12), until the communication quality requirements of all users are satisfied.

Figure 13:
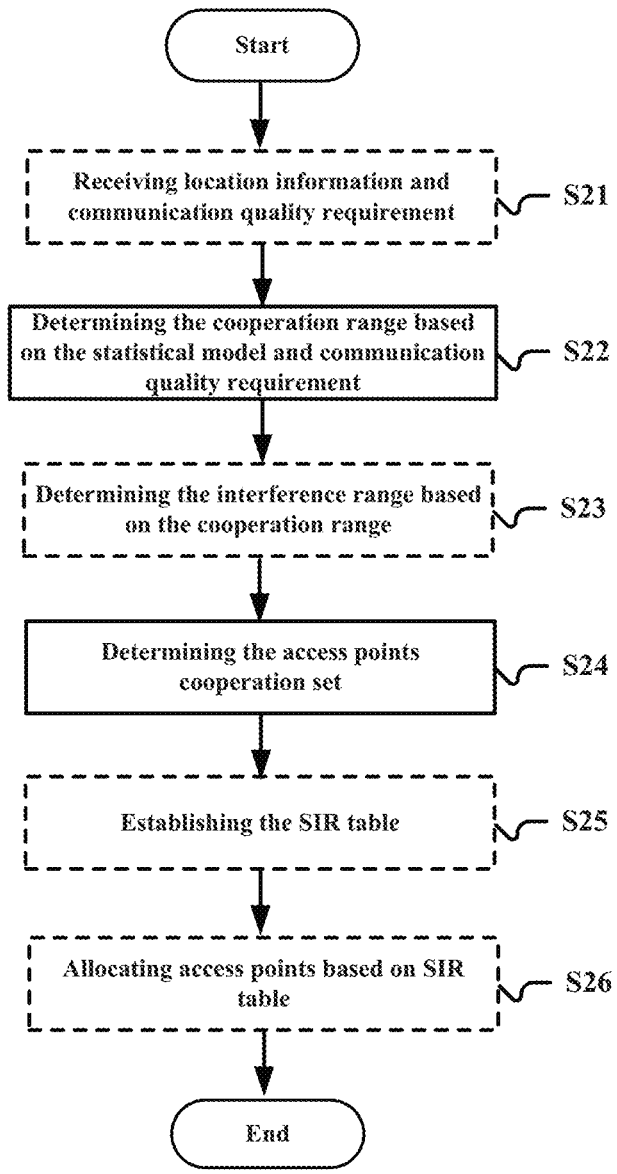
FIG. 13 shows a flowchart of a method for wireless communications according to an embodiment of the present disclosure.

FIG. 13 shows a flowchart of a method for wireless communications according to an embodiment of the present disclosure. As shown in FIG. 13, the method includes the following steps: determining, with respect to each user, a cooperation range of the user based on a statistical model representing a distribution of access points within a predetermined range around the user, and a communication quality requirement of the user (S22): and determining an access points cooperation set of the user based on the cooperation range (S24). An access point in the access points cooperation set is allocated to the user to perform cooperative transmission.

For example, in step S22, a statistical model may be constructed or parameters of a predetermined statistical model may be determined based on an actual distribution of the access points. The communication quality requirement may be represented by an SINR threshold, for example.

As shown by a dashed line block in FIG. 13, the above method may further include a step S21: receiving location information and a communication quality requirement of each user. In addition, in step S21, at least one of the following may be received: information on a received useful signal threshold and a received interference signal threshold of each user, and location information and maximum emission power information of each access point. The information is used in the subsequent processing such as the determination of the cooperation range and the determination of the access points cooperation set.

As shown by another dashed line block shown in FIG. 13, the method may further include a step S23: determining, with respect to each user, an interference range of the user based on the cooperation range of the user. An access point in the interference range of the user generates interferences on the user when serving another user. Accordingly, in step S24, an access points cooperation set of the user is determined based on the cooperation range of the user and an interference range of another user. For example, access points located in the cooperation range of the user and outside of the interference range of any other user may be selected to form the access points cooperation set of the user.

In an example, a ratio of an interference radius of the interference range to a cooperation radius of the cooperation range is determined based on a ratio of a received useful signal threshold to a received interference signal threshold of the user. The cooperation radius of the user may be calculated by causing the SINR of the user calculated based on the statistical model to be greater than or equal to the SINR threshold, thereby calculating the interference radius of the user.

In an example, the above method may further include a step S25: establishing an SIR table, where each value in the SIR table is a ratio of a useful signal provided to the user by a corresponding access point to total interferences generated by the access point to other users. In the example, the method further includes a step S26: selecting an access point for cooperative transmission from among the access points cooperation set based on the SIR table.

For example, in step S26, the following operations may be performed. A user and access point pair which generates the largest enhancement in a sum utility value for all users is selected from among user and access point pairs formed by the access point corresponding to the largest SIR of each user and the user. The sum utility value reflects the overall communication quality of all the users. Moreover, the user and access point pair is not taken into consideration in next allocation, and the operation of step S26 is repeated. For example, for a specific user, when the communication quality requirement of the user is satisfied, the allocation of the access point to the user is stopped. In addition, the allocation of the access point is stopped when the SUM utility value converges or begins to decrease, that is, step S26 is no longer repeated. If there is a user whose communication quality requirement is not satisfied when the allocation of the access points to all the users is completed, an access point is allocated to the user whose communication quality requirement is not satisfied on a new frequency band.

For example, the sum utility value is a function of the communication quality of the user. The communication quality of the user is obtained by calculating based on location information of the user and each access point and the emission power of each access point, such as the SINR of the user. The sum utility value may be calculated with the sum utility function for example. The sum utility function may be a non-linear function of the SINR, for example.

Figure 14:
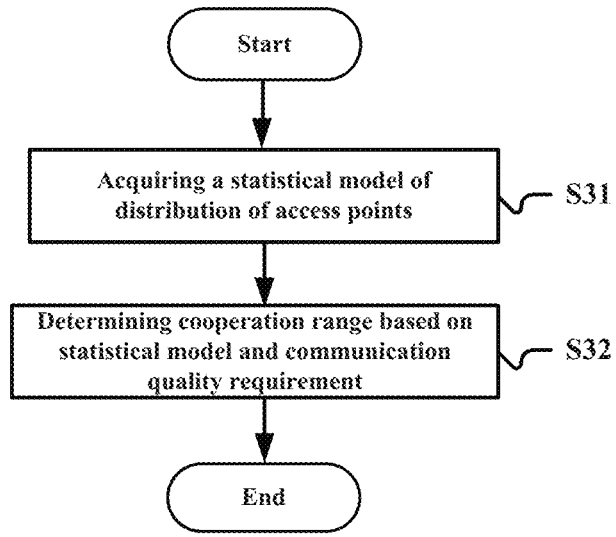
FIG. 14 shows a flowchart of a method for wireless communications according to an embodiment of the present disclosure.

FIG. 14 shows a flowchart of a method for wireless communications according to another embodiment of the present disclosure. The method includes: acquiring a statistical model of a distribution of access points in a predetermined range around a user (S31); and determining a cooperation range of the user based on the statistical model and a communication quality requirement of the user, where the cooperation range is provided to a management apparatus for use in allocation of access points for the user (S32).

In step S32, an interference range of the user may be further determined based on the cooperation range of the user. An access point in the interference range of the user generates interferences on the user when serving another user, and the interference range of the user is also provided to the management apparatus for use in allocation of the access points for the user. It may be seen that, in the method, the user side determines the cooperation arrange and the interference range, and the management apparatus allocates the access points based on the cooperation range and the interference range of each user.

Figure 15:
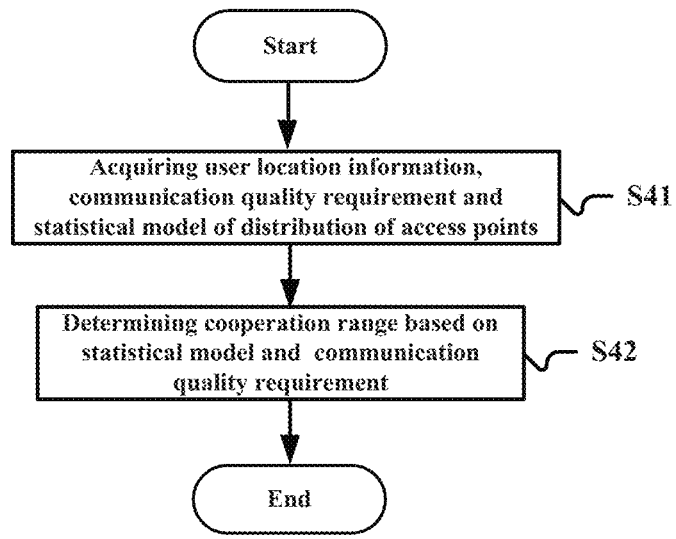
FIG. 15 shows a flowchart of a method for wireless communications according to an embodiment of the present disclosure.

FIG. 15 shows a flowchart of a method for wireless communications according to another embodiment of the present disclosure. The method includes: acquiring location information and a communication quality requirement of a user and a statistical model representing a distribution of access points within a predetermined range around the user (S41); and determining a cooperation range of the user based on the statistical model and the communication quality requirement of the user, where the cooperation range of the user is provided to a management apparatus for use in allocation of access points for the user (S42).

In step S42, an interference range of the user may be further determined based on the cooperation range of the user. An access point in the interference range of the user generates interferences on the user when serving another user, and the interference range of the user is also provided to the management apparatus for use in allocation of the access points for the user. It may be seen that, in the method, the user side determines the cooperation arrange and the interference range, and the management apparatus allocates the access points based on the cooperation range and the interference range of each user.

It should be noted that, the above methods can be performed separately or in combination with each other, and the details thereof are described in the first to the fourth embodiments, which are not repeatedly described herein.

In order to facilitate understanding, comparison of system performances in a case that three algorithms are applied to three different scenarios is described below: 1) a fixed cooperation radius estimation algorithm, that is, all users have the same cooperation radius calculated according to a received useful signal power threshold; 2) a cooperation radius estimation algorithm based on a statistical geometric model according to the present disclosure, in which, all access points in an access points cooperation set determined based on a cooperation radius and an interference radius function as cooperation access points of the user; and 3) an algorithm for selecting an access point based on an SIR table and a utility function according to the present disclosure.

Figure 16:
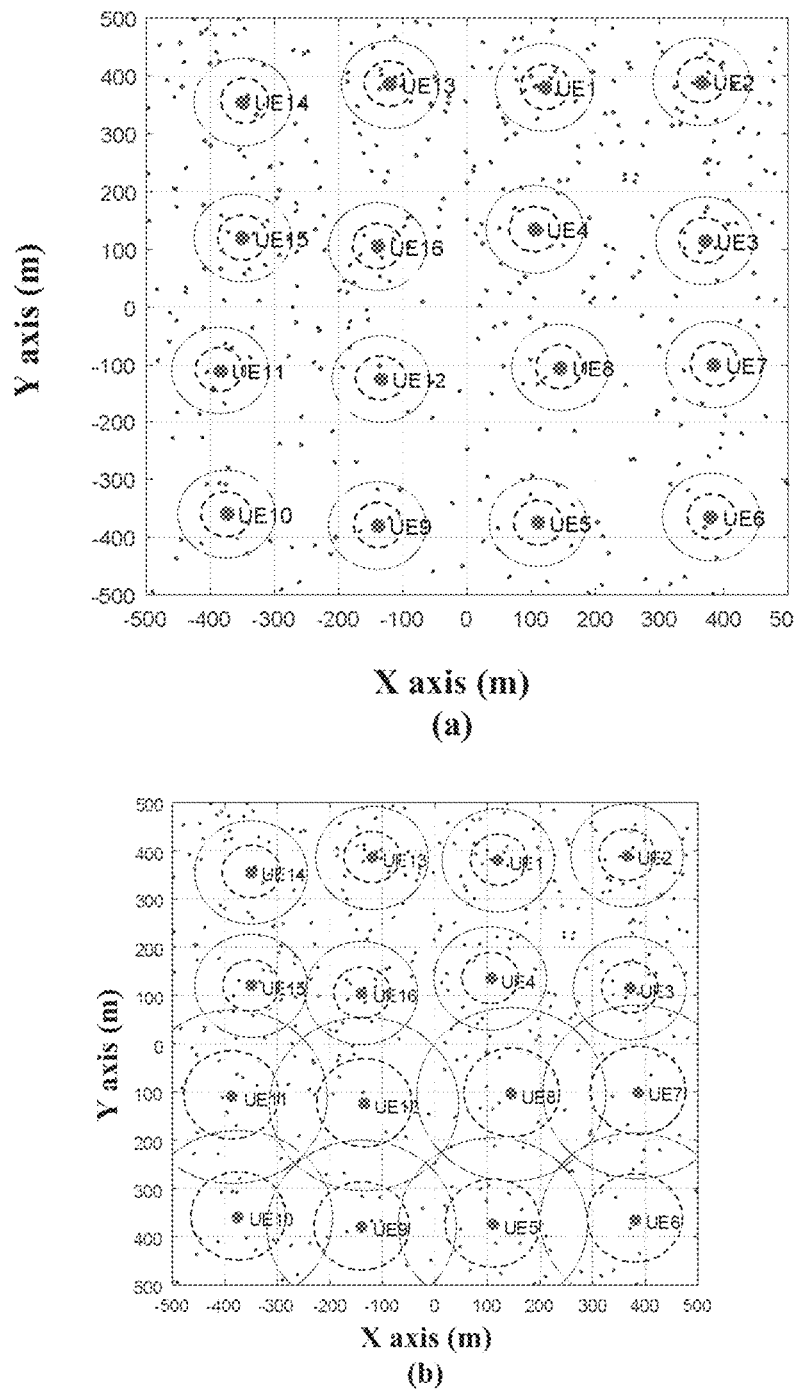
FIG. 16 shows simulation scenario 1 of UCN.

FIG. 16 shows a simulation scenario 1 of UCN. The users have the same communication quality requirement, that is, the same SINR threshold; but densities of APs are different, and a density of APs located in an upper half portion is twice of a density of APs located in a lower half portion. (a) of FIG. 16 shows a cooperation radius and an interference radius obtained by adopting the algorithm 1) (same for each user), and (b) of FIG. 16 shows the same cooperation radius and interference radius obtained by adopting the algorithms 2) and 3). For each user, the corresponding cooperation radius is indicated by a dashed line circle taking the user as a center, and the corresponding interference radius is indicated by a solid line circle taking the user as a center. Since the densities of APs are different while the SINR thresholds of the users are same, the cooperation radius obtained by estimating based on the statistical model for users located in the upper half portion is relatively smaller in (b) of FIG. 16.

The following parameters are adopted in simulation. An operation frequency is 28 GHz, a channel width is 20 MHz, the number of UEs is 16, an emission power is 0 dBm, an SINR threshold of the UE is 7 dB, a simulation region occupies 1000 m×1000 m, the total number of APs in the simulation region is 400, a noise figure of a receiver of the UE is 5 dB, sensitivity of the receiver is −93 dBm, and an interference threshold is −99 dBm.

Figure 17:
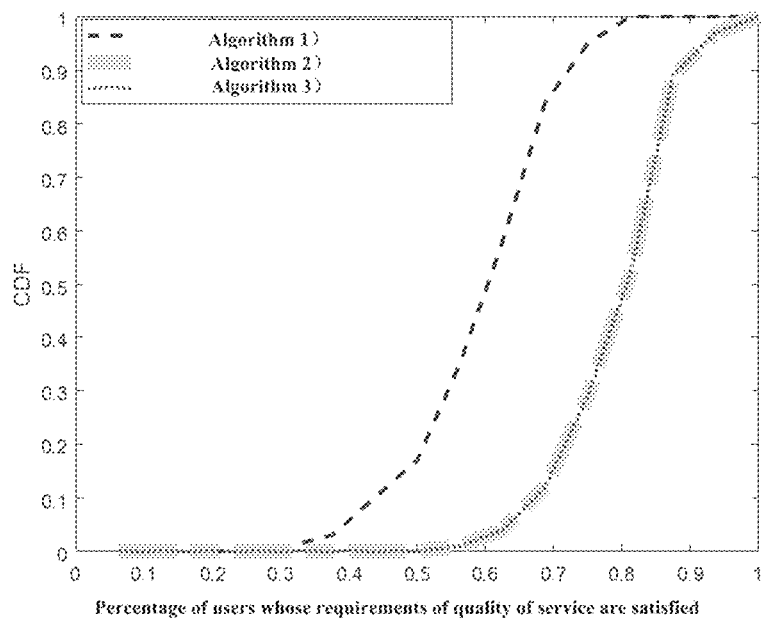
FIG. 17 shows a graph of comparison of cumulative density functions (CDFs) for user success rates in cases of adopting different algorithms in the simulation scenario 1.
Figure 18:
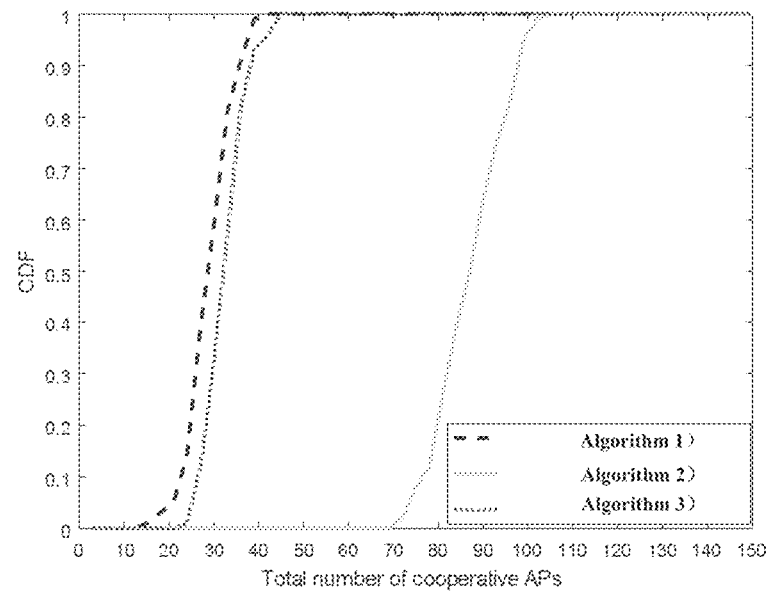
FIG. 18 shows a graph of comparison of CDFs for the total numbers of used APs in cases of adopting different algorithms in the simulation scenario 1.

Simulation results are shown by FIG. 17 and FIG. 18. As shown by FIG. 17, the algorithms 2) and 3) mentioned in the present disclosure have a user success rate of substantially the same proportion, and the performances of the algorithms 2) and 3) are much better than the performance of the fixed cooperation radius estimation algorithm 1) since the density of APs and different requirements on quality of service are considered. As shown by FIG. 18, the total number of APs used in the algorithm 3) is significantly less than the total number of APs used in the algorithm 2) in which all APs in the access points cooperation set function as the cooperative APs of the user, thereby significantly improving the usage efficiency of APs.

Figure 19:
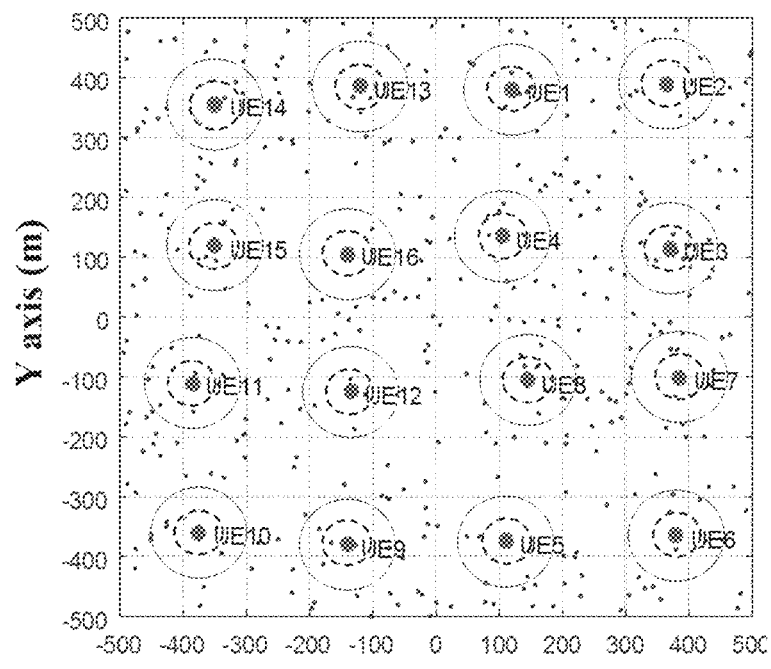
FIG. 19 shows a simulation scenario 2 of UCN.
Figure 19:
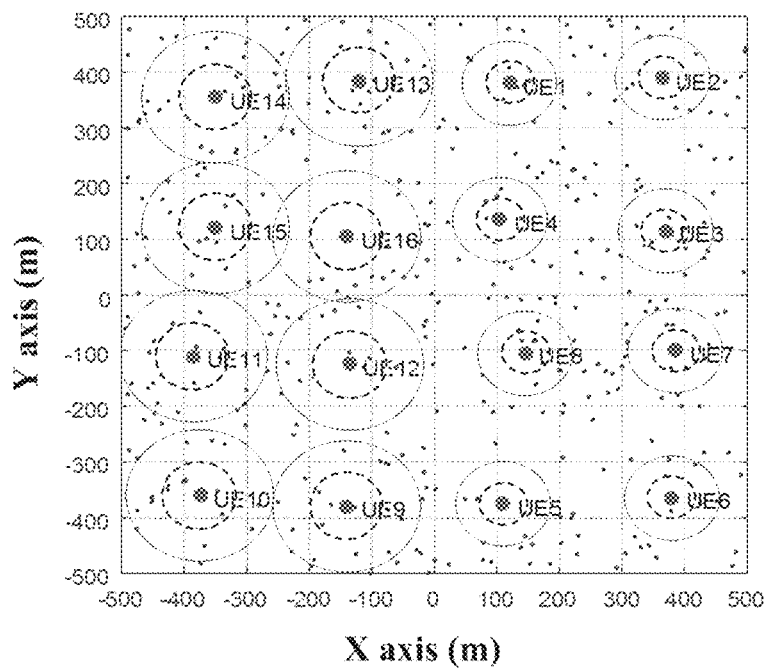

FIG. 19 shows a simulation scenario 2 of UCN. The densities of APs are the same, users have different communication quality requirements, that is, different SINR thresholds, and users located in a left half portion have higher SINR thresholds. (a) of FIG. 19 shows a cooperation radius and an interference radius obtained by adopting the algorithm 1) (same for each user), and (b) of FIG. 19 shows the same cooperation radius and interference radius obtained by adopting the algorithms 2) and 3). For each user, the corresponding cooperation radius is indicated by a dashed line circle taking the user as a center, and the corresponding interference radius is indicated by a solid line circle taking the user as a center. Since the densities of the APs are same and the SINR thresholds of the users are different, the cooperation radius obtained by estimating based on the statistical model for the users in the left half portion is relatively larger in (b) of FIG. 19.

Simulation parameters in the scenario 2 are described as follows. An operation frequency is 28 GHz, a channel width is 20 MHz, the number of UEs is 16, an emission power is 6 dBm, an SINR threshold of the UE in the left half portion is 7.5 dB, an SINR threshold of the UE in the right half portion is 7 dB, a simulation region occupies 1000 m×1000 m, the total number of cooperative APs in the simulation region is 400, a noise figure of a receiver of the UE is 5 dB, sensitivity of the receiver is −87 dBm, and an interference threshold is −93 dBm.

Figure 20:
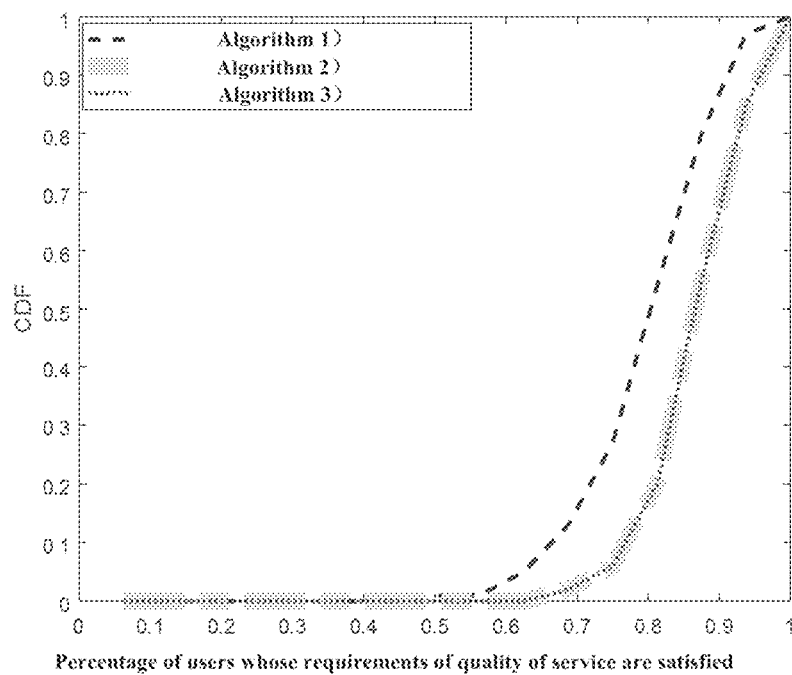
FIG. 20 shows a graph of comparison of cumulative density functions (CDFs) for user success rates in cases of adopting different algorithms in the simulation scenario 2.
Figure 21:
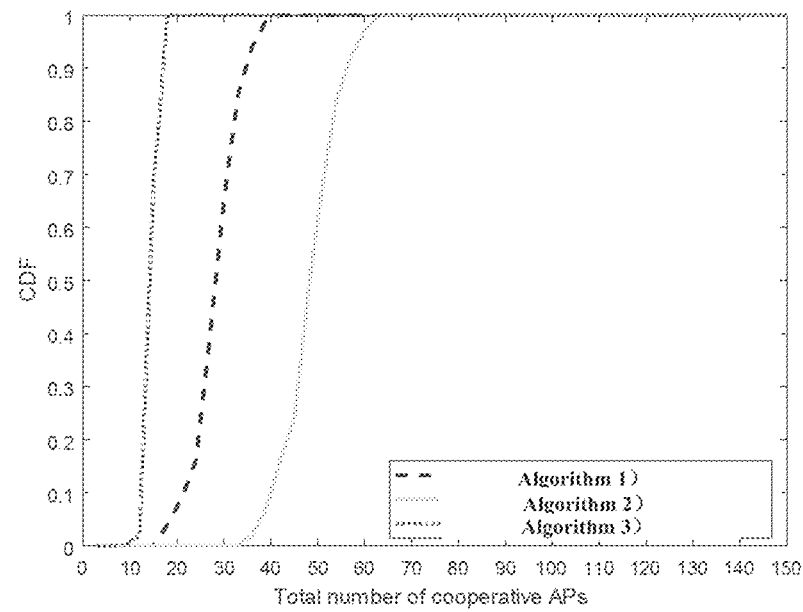
FIG. 21 shows a graph of comparison of CDFs for the total numbers of used APs in cases of adopting different algorithms in the simulation scenario 2.

Simulation results are shown by FIG. 20 and FIG. 21. It may be seen that the conclusion is similar to the conclusion under the scenario 1. The performances of the algorithms 2) and 3) mentioned in the present disclosure are much better than the performance of the fixed cooperation radius estimation algorithm 1), and the usage efficiency of the APs are improved significantly in the algorithms 2) and 3).

Figure 22:
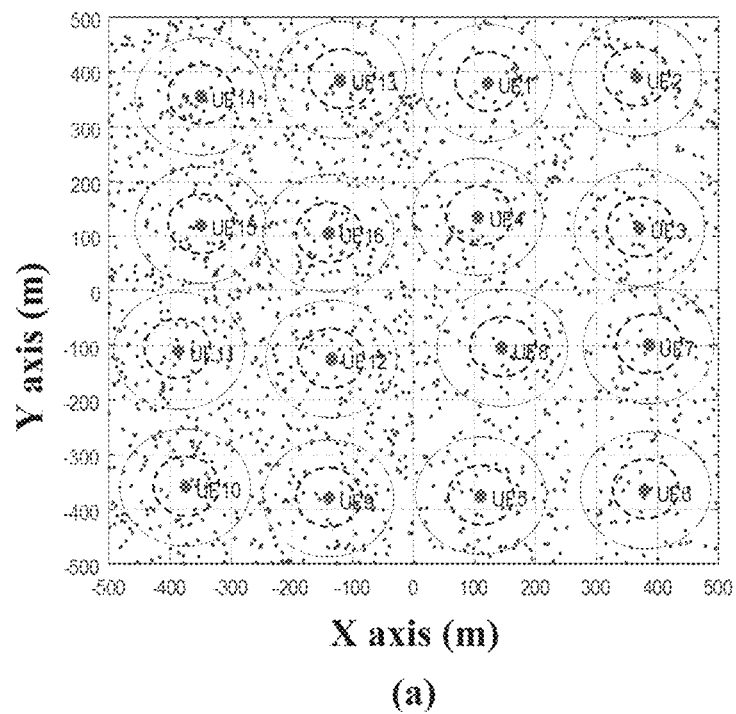
FIG. 22 shows a simulation scenario 3 of UCN.
Figure 22:
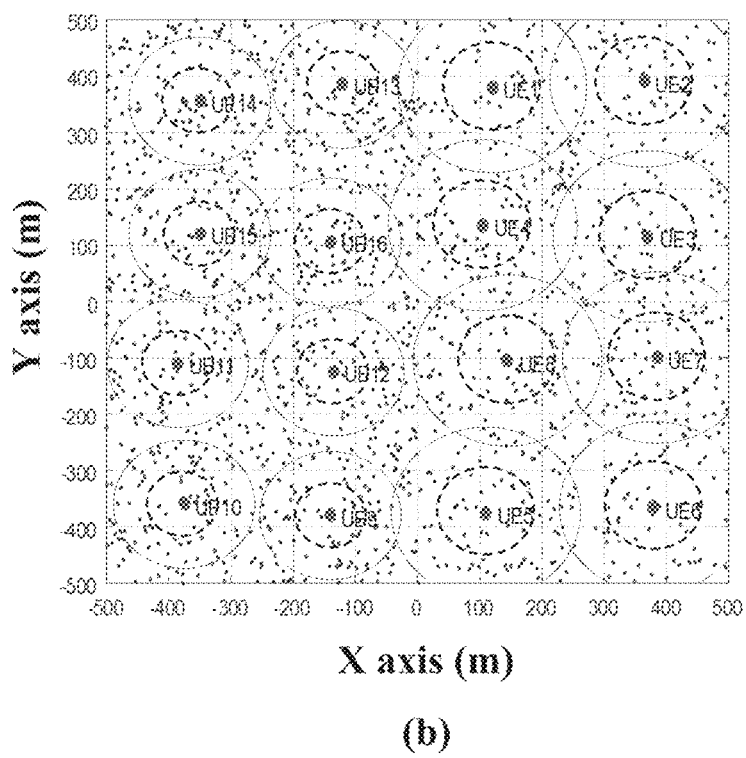

In the scenario 1 and the scenario 2, no random beamforming is adopted by antennas of the access points. In a scenario 3, it is assumed that random beamforming is adopted by the antennas of the access points, the users have the same SINR thresholds, and densities of APs are different, as shown by FIG. 22. It is assumed that the random beamforming includes $N_d$ possible beam directions (beam width is $2\pi/N_d$), and an array gain is G. In order to achieve the same performance as the performance when no random beamforming is adopted, the density of the access points should be $\lambda_a \cdot N_d$. Accordingly, in equation (4), q is modified to be $$q = 2\pi \cdot \frac{\lambda_a}{N_d} P_t g \beta,$$

where g indicates a linear value of the array gain (a) of FIG. 22 shows a cooperation radius and an interference radius obtained by adopting the algorithm 1) (same for each user), and (b) of FIG. 22 shows the same cooperation radius and interference radius obtained by adopting the algorithms 2) and 3). For each user, the corresponding cooperation radius is indicated by a dashed line circle taking the user as a center, and the corresponding interference radius is indicated by a solid line circle taking the user as a center.

Simulation parameters in the scenario 3 are described as follows. An operation frequency is 28 GHz, a channel width is 20 MHz, the number of UEs is 16, an emission power is 0 dBm, an SINR threshold of the UE is 7 dB, an antenna gain is 6 dB, the number ($N_d$) of beam directions is 4, a simulation region occupies 1000 m×1000 m, the total number of APs in the simulation region is 1600, a noise figure of a receiver of the UE is 5 dB, sensitivity of the receiver is −90 dBm, and an interference threshold is −96 dBm.

Figure 23:
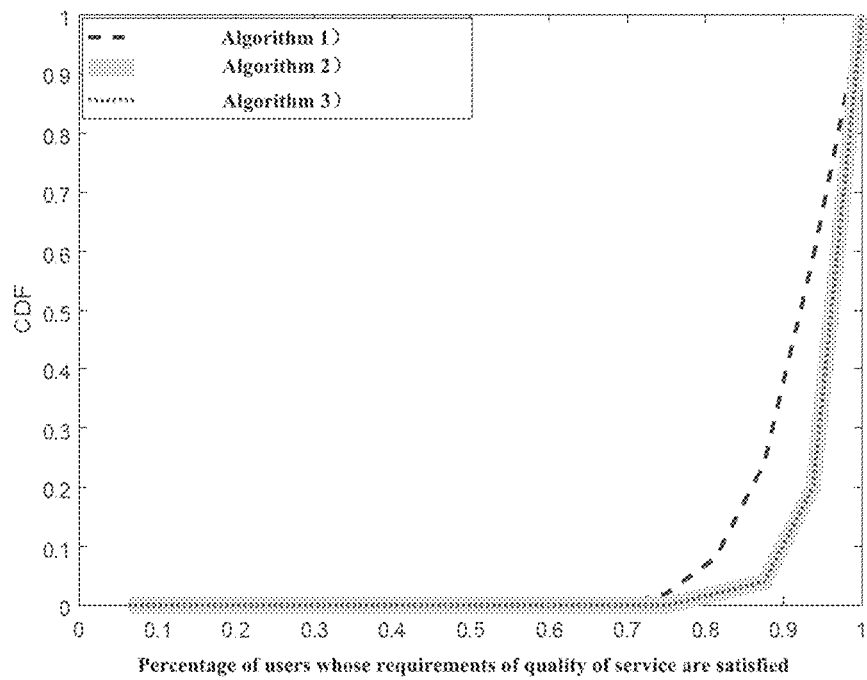
FIG. 23 shows a graph of comparison of cumulative density functions (CDFs) for user success rates in cases of adopting different algorithms in the simulation scenario 3.
Figure 24:
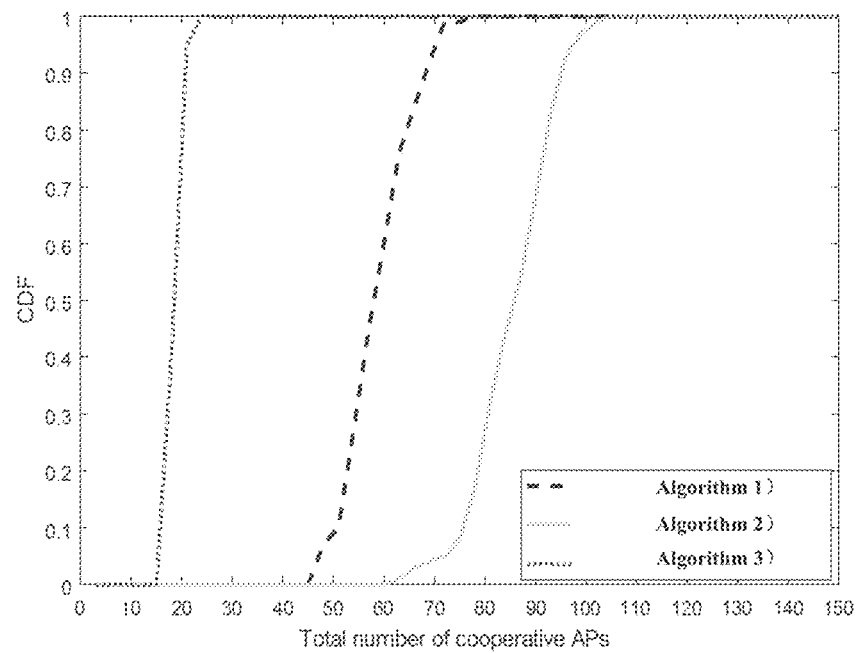
FIG. 24 shows a graph of comparison of CDFs for the total numbers of used APs in cases of adopting different algorithms in the simulation scenario 3.

Simulation results are shown by FIG. 23 and FIG. 24. It may be seen that, as compared with FIG. 17 and FIG. 18 corresponding to the scenario 1, a higher user success rate and a higher AP usage efficiency can be obtained in the scenario 3 in which the random beamforming is adopted.

It should be understood that the above simulation is only exemplary and does not intend to limit the present disclosure.

The technology of the present disclosure may be applied to various products. For example, the electronic device 100 may be implemented as any type of server, such as a tower type server, a rack type server and a blade type server. The electronic device 100 may be a control module installed in the server (such as an integrated circuit module including a single water, and a card or blade inserted into a slot of the blade type server).

[Application Example Regarding a Server]

Figure 25:
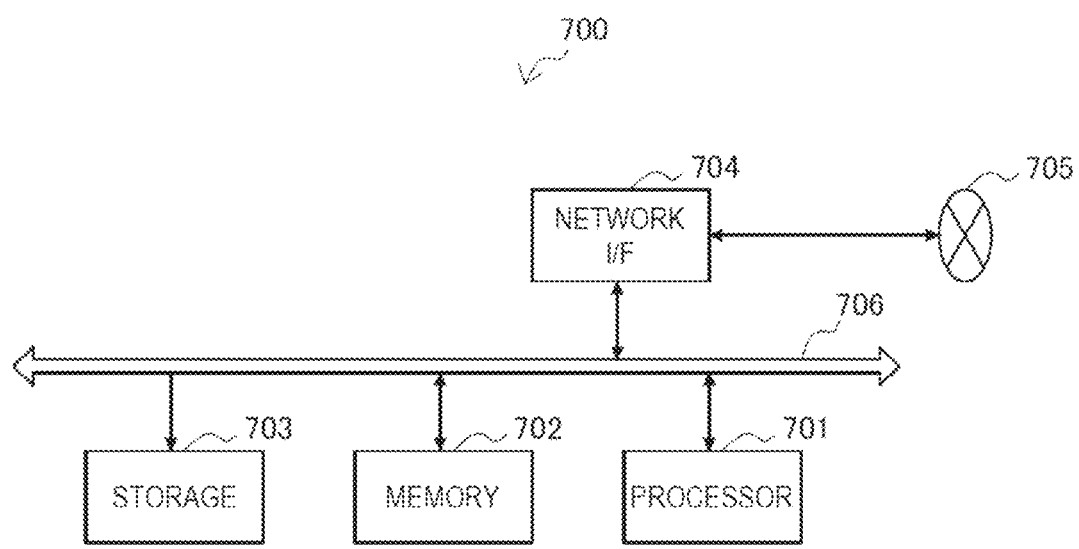
FIG. 25 shows a block diagram of an example of a schematic configuration of a server 700 to which the technology of the present disclosure may be applied.

FIG. 25 shows a block diagram of an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP), and controls functions of the server 700. The memory 702 includes random access memory (RAM) and read only memory (ROM), and stores a program that is executed by the processor 701 and data. The storage 703 may include a storage medium such as a semiconductor memory and a hard disk.

The network interface 704 is a wired communication interface for connecting the server 700 to a wired communication network 705. The wired communication network 705 may be a core network such as an Evolved Packet Core (EPC), or a packet data network (PDN) such as the Internet.

The bus 706 connects the processor 701, the memory 702, the storage 703, and the network interface 704 to each other. The bus 706 may include two or more buses (such as a high speed bus and a low speed bus) each of which has different speed.

In the server 700 shown in FIG. 25, the first determining unit 101 and the second determining unit 102 described with reference to FIG. 2 and FIG. 5 may be implemented by the processor 701. For example, the processor 701 may allocate the access points by executing the functions of the first determining unit 101 and the second determining unit 102.

[Application Examples Regarding a Base Station]

(First Application Example)

Figure 26:
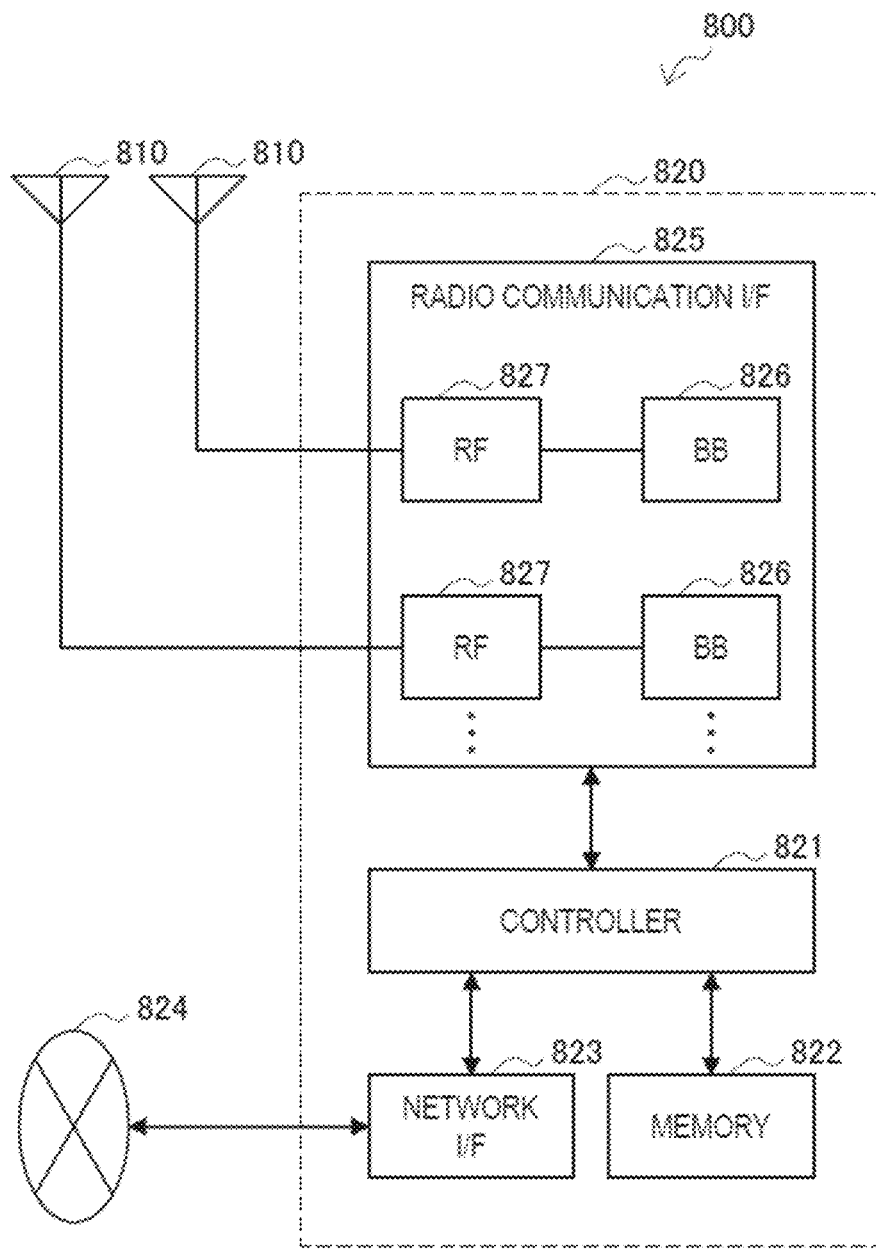
FIG. 26 is a block diagram illustrating a first example of a schematic configuration of an eNB to which the technology of the present disclosure may be applied.

FIG. 26 is a block diagram illustrating a first example of a schematic configuration of an eNB to which the technology of the present disclosure may be applied. An eNB 800 includes one or more antennas 810 and a base station apparatus 820. The base station apparatus 820 and each of the antennas 810 may be connected to each other via a radio frequency (RF) cable. Each of the antennas 810 includes a single or multiple antennal elements (such as multiple antenna elements included in a multiple-input multiple-output (MIMO) antenna and is used for the base station apparatus 820 to transmit and receive less signals. As shown in FIG. 26, the eNB 800 may include the multiple antennas 810. For example, the multiple antennas 810 may be compatible with multiple frequency bands used by the eNB 800. Although FIG. 26 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As show in FIG. 26, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 26. For example, the multiple RF circuits 827 may be compatible with multiple antenna elements. Although FIG. 26 shows the example in which the radio communication interface 825 includes the multiple BB processors 826 and the multiple RF circuits 827, the radio communication interface 825 may also include a single BB processor 826 and a single RF circuit 827.

(Second Application Example)

Figure 27:
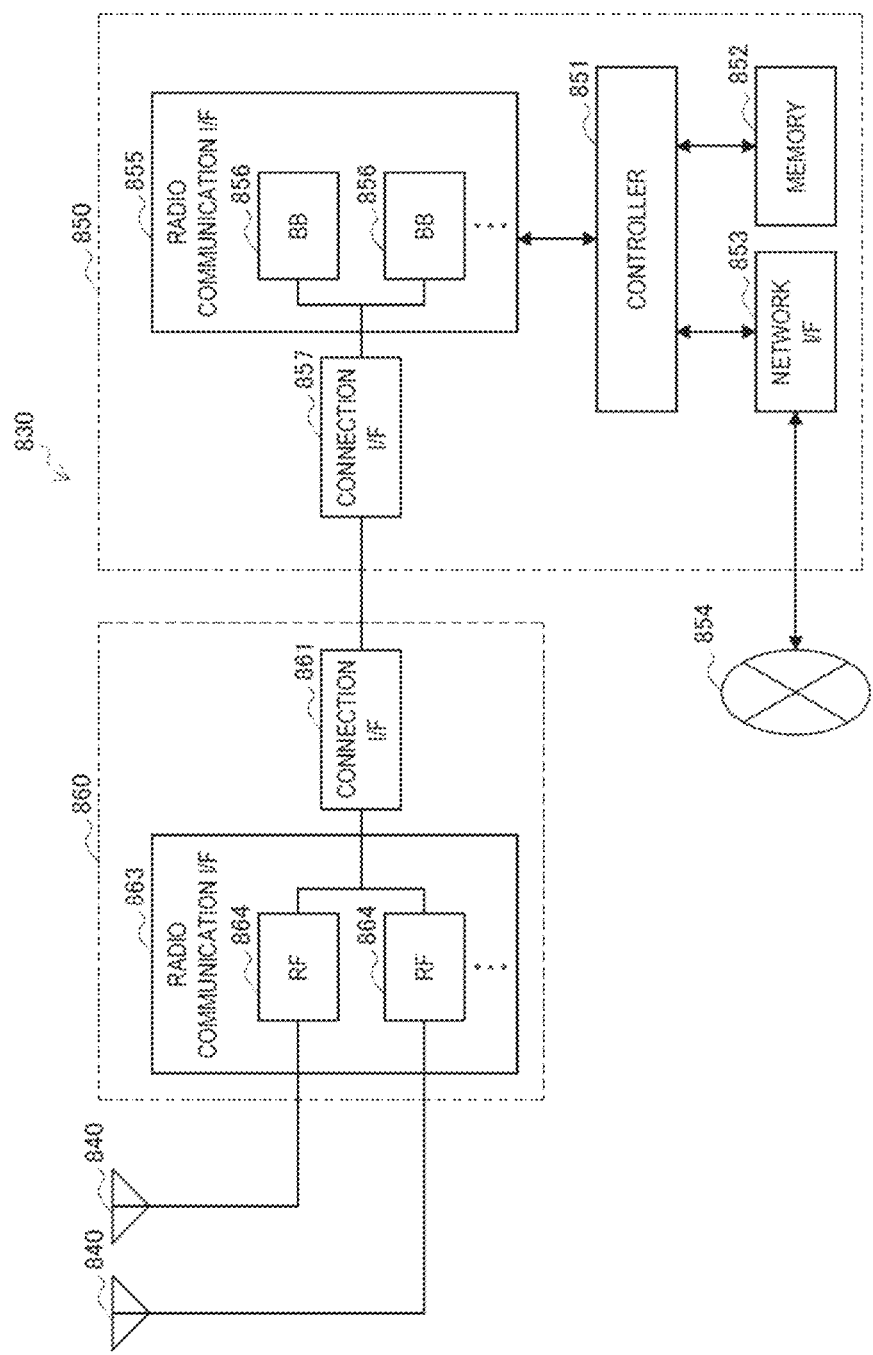
FIG. 27 is a block diagram illustrating a second example of a schematic configuration of an eNB to which the technology of the present disclosure may be applied.

FIG. 27 is a block diagram illustrating a second example of a schematic configuration of an eNB to which the technology of the present disclosure may be applied. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 27, the eNB 830 may include the multiple antennas 840. For example, the multiple antennas 840 may be compatible with multiple frequency bands used by the eNB 830. Although FIG. 27 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 26.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 27, except that the BB processor 856 is connected to an RF circuit 864 of the RRH 860 via the connection interface 857. As show in FIG. 27, the radio communication interface 855 may include the multiple BB processors 856. For example, the multiple BB processors 856 may be compatible with multiple frequency bands used by the eNB 830. Although FIG. 27 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 27. For example, the multiple RF circuits 864 may support multiple antenna elements. Although FIG. 27 shows the example in which the radio communication interface 863 includes the multiple RF circuits 864, the radio communication interface 863 may also include a single RF circuit 864.

In the eNB 800 and eNB 830 shown in FIG. 26 and FIG. 27, the transceiving unit described in the fourth embodiment may be implemented by the radio communication interface 825 and the radio communication interface 855 and/or the radio communication interface 863. At least a part of the functions may be implemented by the controller 821 and the controller 851. The acquiring unit 301 and the determining unit 302 described with reference to FIG. 11 may be implemented by the controller 821 and the controller 851. For example, the controller 821 and the controller 851 may determine the cooperation range by implementing the functions of the acquiring unit 301 and the determining unit 302.

(Application Example Regarding a Terminal Device)
(First Application Example)

Figure 28:
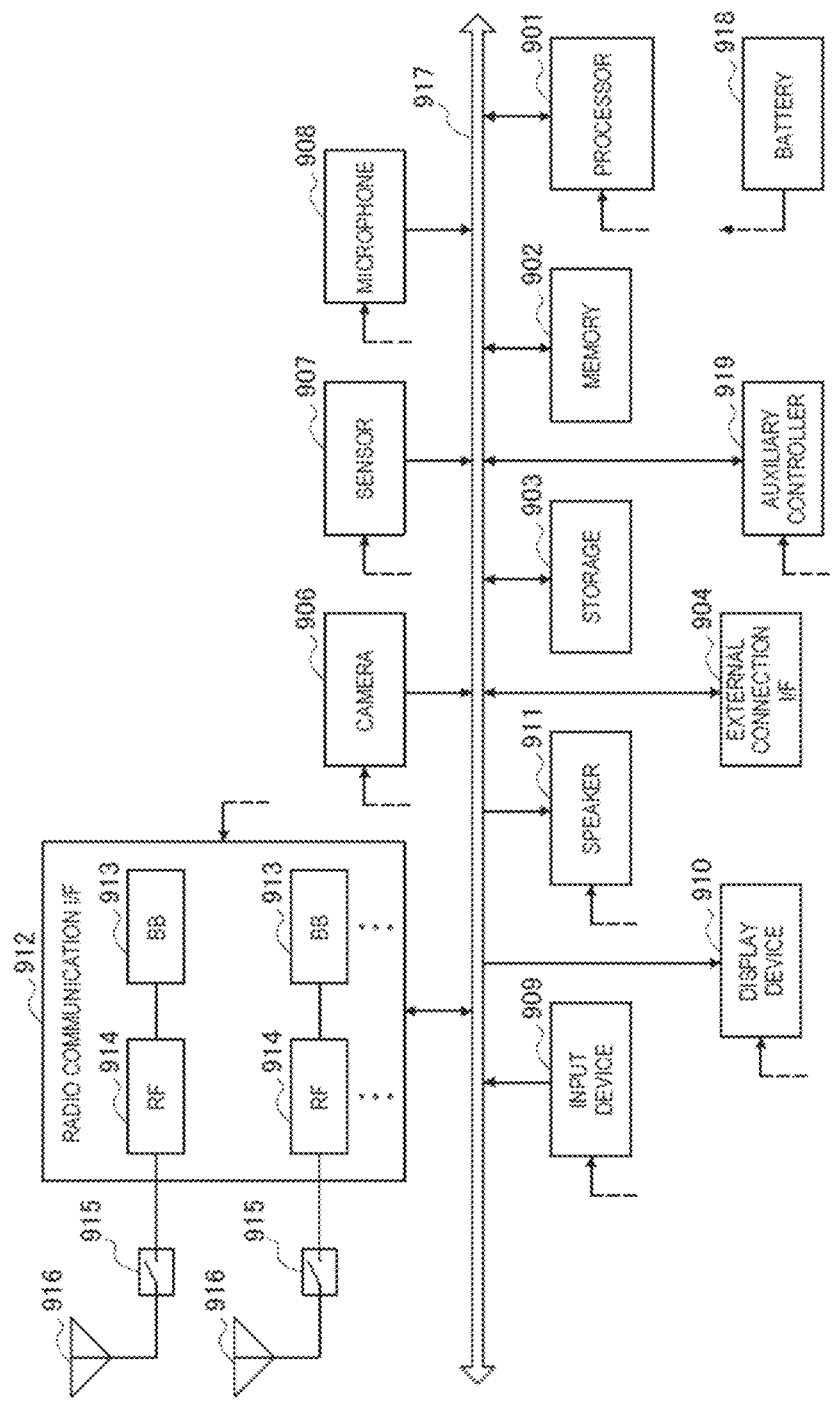
FIG. 28 is a block diagram illustrating an example of a schematic configuration of a smart phone to which the technology of the present disclosure may be applied.

FIG. 28 is a block diagram illustrating an example of a schematic configuration of a smartphone 900 to which the technology of the present disclosure may be applied. The smart phone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smart phone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smart phone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smart phone 900. The speaker 911 converts audio signals that are outputted from the smart phone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. The radio communication interface 912 may be a chip module having the BB processor 913 and the RF circuit 914 integrated thereon. The radio communication interface 912 may include multiple BB processors 913 and multiple RF circuits 914, as shown in FIG. 28. Although FIG. 28 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes included in the radio communication interface 912.

Each of the antennas 916 includes a single or multiple antenna elements (such as multiple antenna elements included in an MIMO antenna) and is used for the radio communication interface 912 to transmit and receive wireless signals. The smart phone 900 may include the multiple antennas 916, as shown in FIG. 28. Although FIG. 28 shows the example in which the smart phone 900 includes the multiple antennas 916, the smart phone 900 may also include a single antenna 916.

Furthermore, the smart phone 900 may include the antenna 916 for each wireless communication scheme. In this case, the antenna switches 915 may be omitted from the configuration of the smart phone 900.

The bus 917 connects the processor 901, the memory 902, the storage 903, the external connection interface 904, the camera 906, the sensor 907, the microphone 908, the input device 909, the display device 910 the speaker 911, the radio communication interface 912, and the auxiliary controller 919 to each other. The battery 918 supplies power to blocks of the smart phone 900 shown in FIG. 28 via feeder lines that are partially shown as dashed lines in FIG. 28. The auxiliary controller 919, operates a minimum necessary function of the smart phone 900, for example, in a sleep mode.

In the smart phone 900 shown in FIG. 28, the transceiving unit described in the third embodiment may be implemented by the radio communication interface 912. At least a part of the functions may be implemented by the processor 901 or the auxiliary controller 919. The acquiring unit 201 and the determining unit 202 described with reference to FIG. 10 may be implemented by the processor 901 or the auxiliary controller 919. For example, the processor 901 or the auxiliary controller 919 may determine the cooperation range by implementing the functions of the acquiring unit 201 and the determining unit 202.

(Second Application Example)

Figure 29:
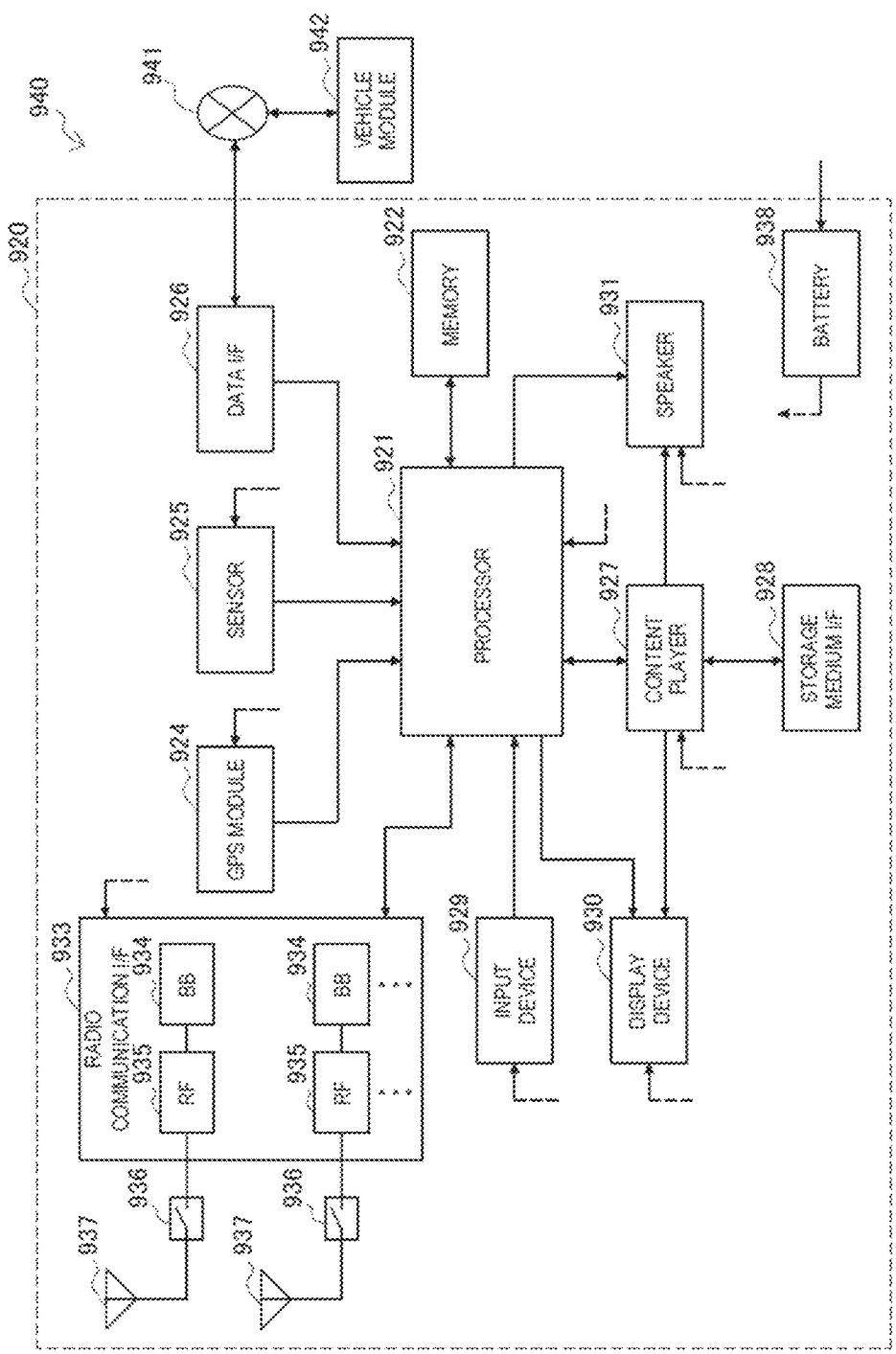
FIG. 29 is a block diagram illustrating an example of a schematic configuration of a car navigation device to which the technology of the present disclosure may be applied.

FIG. 29 is a block diagram illustrating an example of a schematic configuration of a car navigation apparatus 920 to which the technology of the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a 133 processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 29. Although FIG. 29 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 29, the car navigation apparatus 920 may include the multiple antennas 937. Although FIG. 29 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 29 via feeder lines that are partially shown as dash lines in FIG. 29. The battery 938 accumulates power supplied from the vehicle.

in the automobile navigation device 920 shown in FIG. 29, the transceiving unit described in the third embodiment may be implemented by the radio communication interface 933. At least a part of the functions may be implemented by the processor 921. The acquiring unit 201 and the determining unit 202 described with reference to FIG. 10 may be implemented by the processor 921. For example, the processor 921 may determine the cooperation range by performing the functions of the acquiring unit 201 and the determining unit 202.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 3000 shown in FIG. 30) from a storage medium or network, wherein the computer is capable of implementing various functions when installed with various programs.

Figure 30:
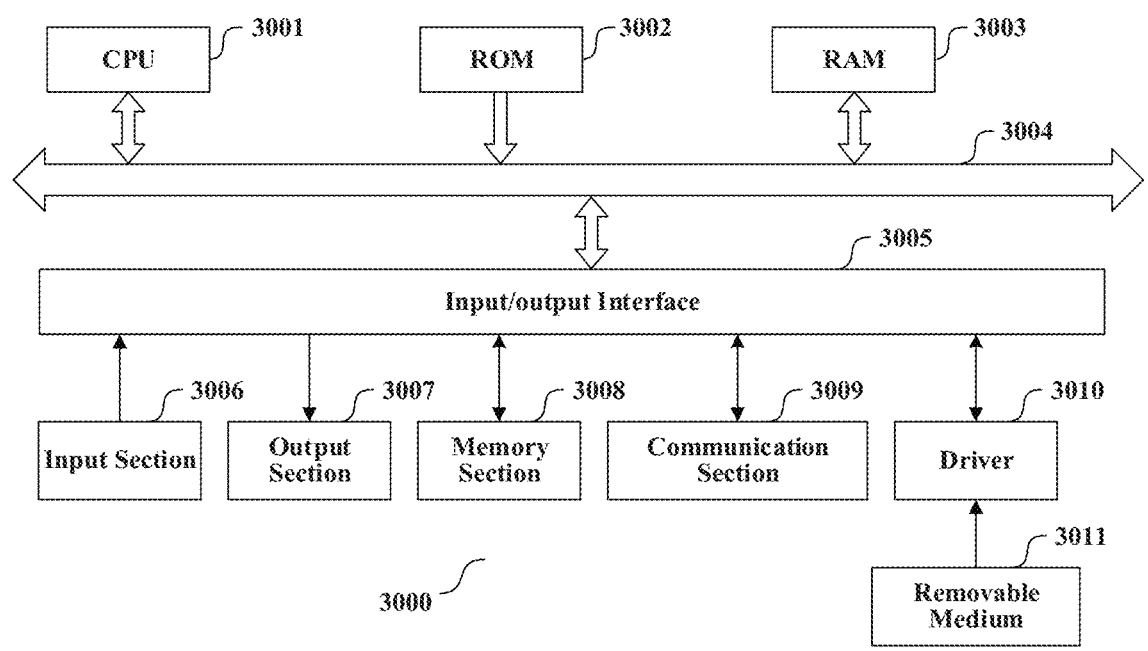
FIG. 30 is a block diagram of an exemplary block diagram illustrating the structure of a general purpose personal computer capable of realizing the method and/or device and/or system according to the embodiments of the present disclosure

In FIG. 30, a central processing unit (CPU) 3001 executes various processing according to a program stored in a read-only memory (ROM) 3002 or a program loaded to a random access memory (RAM) 3003 from a memory section 3008. The data needed for the various processing of the CPU 3001 may be stored in the RAM 3003 as needed. The CPU 3001, the ROM 3002 and the RAM 3003 are linked with each other via a bus 3004. An input/output interface 3005 is also linked to the bus 3004.

The following components are linked to the input/output interface 3005: an input section 3006 (including keyboard, mouse and the like), an output section 3007 (including displays such as a cathode ray tube (CRT), a liquid crystal display (LCD), a loudspeaker and the like), a memory section 3008 (including hard disc and the like), and a communication section 3009 (including a network interface card such as a LAN card, modem and the like). The communication section 3009 performs communication processing via a network such as the Internet. A driver 3010 may also be linked to the input/output interface 3005, if needed. If needed, a removable medium 3011, for example, a magnetic disc, an optical disc, a magnetic optical disc, a semiconductor memory and the like, may be installed in the driver 3010, so that the computer program read therefrom is installed in the memory section 3008 as appropriate.

In the case where the foregoing series of processing is achieved through software, programs forming the software are installed from a network such as the Internet or a memory medium such as the removable medium 3011.

It should be appreciated by those skilled in the art that the memory medium is not limited to the removable medium 3011 shown in FIG. 30, which has program stored therein and is distributed separately from the apparatus so as to provide the programs to users. The removable medium 3011 may be, for example, a magnetic disc (including floppy disc (registered trademark)), a compact disc (including compact disc read-only memory (CD-ROM) and digital versatile disc (MD), a magneto optical disc (including mini disc (MD) (registered trademark)), and a semiconductor memory. Alternatively, the memory medium may be the hard discs included in ROM 3002 and the memory section 3008 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . ." in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic device for wireless communications, comprising:
  processing circuitry, configured to:
    determine, with respect to each user, based on a statistical model representing a distribution of access points within a predetermined range around the user and a communication quality requirement of the user, a cooperation range of the user;
    determine, based on the cooperation range, an access points cooperation set of the user,
    wherein an access point in the access points cooperation set is allocated to the user to perform cooperative transmission; and
    determine, with respect to each user, based on the cooperation range of the user, an interference range of the user,
    wherein an access point in the interference range of the user generates interferences to the user when serving another user.

2. The electronic device according to claim 1, wherein the processing circuitry is configured to determine, with respect to each user, based on the cooperation range of the user and an interference range of another user, the access points cooperation set of the user.

3. The electronic device according to claim 2, wherein the processing circuitry is configured to select access points located within the cooperation range of the user and outside of the interference range of another user to form the access points cooperation set of the user.

4. The electronic device according to claim 1, wherein the processing circuitry is further configured to construct the statistical model or determine parameters of a predetermined statistical model based on an actual distribution of the access points.

5. The electronic device according to claim 1, wherein the processing circuitry is further configured to select an access point for cooperative transmission from among the access points cooperation set, based on a ratio of a useful signal provided to the user by the access point to total interferences generated by the access point to other users.

6. The electronic device according to claim 5, wherein the processing circuitry is configured to calculate the ratio based on location information of each user and the access point and transmission power of the access point.

7. The electronic device according to claim 5, wherein the processing circuitry is configured to repeat the following operations when allocating access points to each user: selecting, from among user and access point pairs formed by the access point corresponding to the largest ratio of each user and the user, a user and access point pair which results in the largest enhancement in a sum utility value for all users, and not taking this user and access point pair into consideration in the next allocation, wherein the sum utility value reflects overall communication quality for all the users.

8. The electronic device according to claim 7, wherein the processing circuitry is configured to stop the allocation of the access points when the sum utility value converges or begins to decrease.

9. The electronic device according to claim 7, wherein the processing circuitry is configured to stop, when the communication quality requirement of a user is satisfied, the allocation of access points for the user.

10. The electronic device according to claim 7, wherein the sum utility value is a function of the communication quality of the user, the communication quality of the user is calculated based on the location information of the user and each access point and a transmission power of each access point.

11. The electronic device according to claim 1, wherein the processing circuitry is configured to allocate, in a case that there is a user whose communication quality requirement is not satisfied when the access points allocation for all the users is completed, the access points for the user whose communication quality requirement is not satisfied in a new frequency band.

12. The electronic device according to claim 1, wherein the access points comprise base stations and/or mobile base stations within a predetermined range around the user.

13. The electronic device according to claim 2, wherein, a ratio of an interference radius of the interference range to a cooperation radius of the cooperation range is determined by a ratio of a received useful signal threshold to a received interference signal threshold of the user.

14. The electronic device according to claim 13, wherein the processing circuitry is configured to calculate the cooperation radius of the user by causing a signal to interference and noise ratio of the user calculated based on the statistical model to be larger than or equal to a signal to interference and noise ratio threshold.

15. The electronic device according to claim 1, further comprising:
   transceiving circuitry, configured to receive location information and a communication quality requirement of each user, wherein the transceiving circuitry is further configured to receive at least one of the following: information of a received useful signal threshold and a received interference signal threshold of each user, location information and or information of a maximum transmission power of each access point.

16. An electronic device for wireless communications, comprising:
   processing circuitry, configured to:
   acquire a statistical model representing a distribution of access points within a predetermined range around a user;
   determine, based on the statistical model and a communication quality requirement of the user, a cooperation range of the user, which is provided to a management apparatus for use in allocation of access points for the user; and
   determine an interference range according to the cooperation range,
   wherein an access point within the interference range generates interferences to the user when serving another user, and the interference range is provided to the management apparatus for use in allocation of access points for the user.

17. An electronic device for wireless communications, comprising:
   processing circuitry, configured to:
   acquire location information and a communication quality requirement of a user and a statistical model representing a distribution of access points within a predetermined range around the user;
   determine, based on the statistical model and the communication quality requirement of the user, a cooperation range of the user, which is provided to a management apparatus for use in allocation of access points for the user; and
   determine an interference range of the user according to the cooperation range of the user,
   wherein an access point within the interference range of the user generates interferences to the user when serving another user, and the interference range of the user is provided to the management apparatus for use in allocation of access points for the user.

* * * * *